United States Patent
Zhang et al.

(10) Patent No.: US 12,108,464 B2
(45) Date of Patent: Oct. 1, 2024

(54) RANDOM ACCESS METHOD AND APPARATUS

(71) Applicant: FUJITSU LIMITED, Kawasaki (JP)

(72) Inventors: Jian Zhang, Beijing (CN); Qinyan Jiang, Beijing (CN); Yang Lu, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 423 days.

(21) Appl. No.: 17/474,138

(22) Filed: Sep. 14, 2021

(65) Prior Publication Data

US 2021/0410182 A1  Dec. 30, 2021

Related U.S. Application Data

(63) Continuation of application No. PCT/CN2019/080587, filed on Mar. 29, 2019.

(51) Int. Cl.
| | | |
|---|---|---|
| *H04W 74/08* | (2024.01) | |
| *H04L 5/00* | (2006.01) | |
| *H04W 74/00* | (2009.01) | |
| *H04W 74/0833* | (2024.01) | |

(52) U.S. Cl.
CPC ......... *H04W 74/085* (2013.01); *H04L 5/0048* (2013.01); *H04W 74/006* (2013.01)

(58) Field of Classification Search
CPC .. H04W 74/085; H04W 74/006; H04L 5/0048
See application file for complete search history.

(56) References Cited

U.S. PATENT DOCUMENTS

| | | | | |
|---|---|---|---|---|
| 10,728,823 | B2 * | 7/2020 | Cheng | H04W 74/008 |
| 10,985,876 | B2 * | 4/2021 | Xiong | H04L 1/1858 |
| 2018/0103492 | A1 * | 4/2018 | Akkarakaran | H04W 72/00 |
| 2018/0146498 | A1 | 5/2018 | Sahlin et al. | |
| 2018/0242367 | A1 | 8/2018 | Kim et al. | |
| 2018/0270799 | A1 | 9/2018 | Noh et al. | |
| 2018/0279327 | A1 | 9/2018 | Ying et al. | |

(Continued)

FOREIGN PATENT DOCUMENTS

| | | |
|---|---|---|
| CN | 105578584 A | 5/2016 |
| CN | 107466112 A | 12/2017 |

(Continued)

OTHER PUBLICATIONS

International Search Report issued by the China National Intellectual Property Administration for corresponding International Patent Application No. PCT/CN2019/080587, mailed on Dec. 16, 2019, with an English translation.

(Continued)

*Primary Examiner* — Bailor C Hsu
(74) *Attorney, Agent, or Firm* — Myers Wolin, LLC

(57) ABSTRACT

A random access method and apparatus. The method includes: transmitting a first random access request at least including a preamble, uplink data and a demodulation reference signal by a terminal equipment to a network device; and receiving a random access response transmitted by the network device; wherein mapping of the preamble to an uplink data channel resource and a demodulation reference signal port is determined according to configuration information or is configured by the network device.

24 Claims, 17 Drawing Sheets

401 a terminal equipment transmits a first random access request at least including a preamble, uplink data and a demodulation reference signal to a network device; wherein mapping of the preamble to an uplink data channel resource of the uplink data and a demodulation reference signal port of the demodulation reference signal is determined according to configuration information from the network device or is configured by the network device

402 the terminal equipment receives a random access response transmitted by the network device

(56) References Cited

U.S. PATENT DOCUMENTS

| | | | |
|---|---|---|---|
| 2019/0313451 A1 | 10/2019 | Liu et al. | |
| 2020/0112994 A1* | 4/2020 | Zhang | H04L 27/2605 |
| 2020/0245373 A1* | 7/2020 | Xiong | H04W 74/0833 |
| 2020/0260499 A1* | 8/2020 | Sarkis | H04W 74/006 |
| 2020/0267774 A1* | 8/2020 | Vos | H04W 74/0833 |
| 2020/0305202 A1* | 9/2020 | Zhang | H04W 76/10 |
| 2020/0351801 A1* | 11/2020 | Jeon | H04W 52/48 |
| 2021/0058971 A1* | 2/2021 | MolavianJazi | H04L 5/0044 |
| 2021/0144742 A1* | 5/2021 | Jeon | H04L 41/06 |
| 2021/0251014 A1* | 8/2021 | Agiwal | H04L 5/0044 |

FOREIGN PATENT DOCUMENTS

| | | | |
|---|---|---|---|
| WO | 2009/020423 A1 | 2/2009 | |
| WO | 2017/030412 A1 | 2/2017 | |
| WO | 2017/209570 A1 | 12/2017 | |
| WO | 2018/204863 A1 | 11/2018 | |

OTHER PUBLICATIONS

Extended European Search Report with supplemental European search report and European search opinion issued by the European Patent Office for corresponding European Patent Application No. 19922832.1 mailed on Apr. 4, 2022.

Nokia et al., "On 2-step RACH Channel Structure", Agenda item: 7.2.1.1, 3GPP TSG RAN WG1#96, R1-1902135, Athens, Greece, Feb. 25-Mar. 1, 2019.

Samsung, "Channel Structure for Two-Step RACH", Agenda item: 7.2.1.1, 3GPP TSG RAN WG1#96, R1-1902241, Athens, Greece, Feb. 25-Mar. 1, 2019.

ZTE et al., "Considerations on the channel structure of msgA", Agenda item: 7.2.1.1, 3GPP TSG RAN WG1 Meeting #96, R1-1901626, Athens, Greece, Feb. 25-Mar. 1, 2019.

CATT, "Discussion on Channel Structure for 2-Step RACH", Agenda item: 7.2.1., 3GPP TSG RAN WG1 Meeting#96, R1-1902027, Athens, Greece, Feb. 25-Mar. 1, 2019.

Examination Report issued by the Patent Office of India for corresponding Indian Patent Application No. 202137039929, dated May 27, 2022, with an English translation.

Notice of Reasons for Refusal issued by the Japan Patent Office for corresponding Japanese Patent Application No. 2021-556933, mailed on Oct. 25, 2022, with an English translation.

Qualcomm Incorporated, "Procedures for Two-Step RACH", Agenda Item: 7.2.1.2, 3GPP TSG-RAN WG1 Meeting #96, R1-1903321, Athens, Greece, Feb. 25-Mar. 1, 2019.

ZTE et al., "Considerations on 2-Step RACH Procedures", Agenda Item: 7.2.1.2, 3GPP TSG-RAN WG1 Meeting #96, R1-1901627, Athens, Greece, Feb. 25-Mar. 1, 2019.

KDDI, "Discussion on channel structure for two-step RACH", Agenda Item: 7.2.1.1, 3GPP TSG-RAN WG1 Meeting #96, R1-1902961, Athens, Greece, Feb. 25-Mar. 1, 2019.

First Notification of Office Action and Search Report issued by the China National Intellectual Property Administration for corresponding Chinese Patent Application No. 201980093406.X, dated May 25, 2023, with an English translation.

Second Notification of Office Action issued by the China National Intellectual Property Administration for corresponding Chinese Patent Application No. 201980093406.X, mailed on Sep. 29, 2023, with an English translation.

Hearing Notice issued by the Indian Patent Office for corresponding Indian Patent Application No. 202137039929, mailed on Jul. 29, 2024, with an English translation.

Notice of Preliminary Rejection issued by the Korean Intellectual Property Office for corresponding Korean Patent Application No. 10-2021-7030441, mailed on May 29, 2024, with an English translation.

* cited by examiner

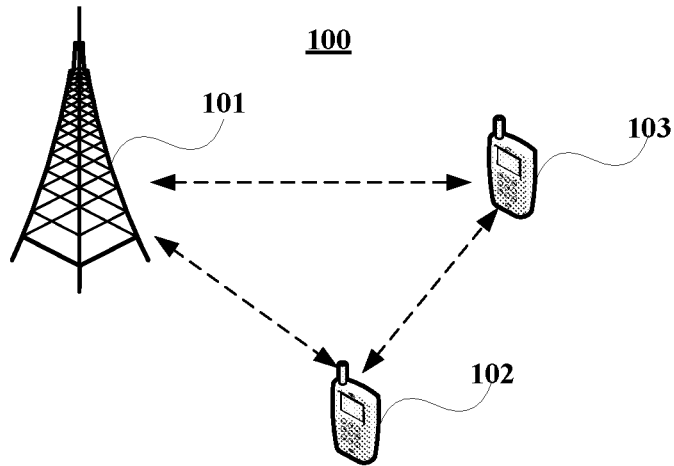

Fig. 3

401 a terminal equipment transmits a first random access request at least including a preamble, uplink data and a demodulation reference signal to a network device; wherein mapping of the preamble to an uplink data channel resource of the uplink data and a demodulation reference signal port of the demodulation reference signal is determined according to configuration information from the network device or is configured by the network device

402 the terminal equipment receives a random access response transmitted by the network device

Fig. 4

RANDOM ACCESS METHOD AND APPARATUS

CROSS-REFERENCE TO RELATED APPLICATION

This application is a continuation application of International Application PCT/CN2019/080587 filed on Mar. 29, 2019 and designated the U.S., the entire contents of which are incorporated herein by reference.

TECHNICAL FIELD

This disclosure relates to the field of communication technologies, and in particular to a random access method and apparatus.

BACKGROUND

In a long term evolution (LTE) system of the 3rd Generation Partnership Project (3GPP), when a terminal equipment initially accesses to a network, it needs to go through processes of cell search, system information (SI) acquisition, and random access, etc. After acquiring downlink synchronization through cell search, the terminal equipment performs random access based on information contained in the system information, such as random access configuration, etc., so as to establish connection with cells and obtain uplink synchronization.

FIG. 1 is a schematic diagram of a random access procedure of LTE, which shall be described by taking a contention-based random access procedure as an example. The process at least includes four steps: transmitting a preamble by a terminal equipment, feeding back a random access response (RAR) by a network device, transmitting Msg3 by the terminal equipment via a physical uplink shared channel (PUSCH), and feeding back Msg4 by the network device via a physical downlink shared channel (PDSCH). Such a random access procedure may be called four-step random access.

FIG. 2 is a schematic diagram of random access procedure of NR, which may be called two-step random access. Compared with the traditional four-step random access, the two-step random access may access to a network more quickly. As shown in FIG. 2, in performing two-step random access, the terminal equipment transmits msgA, wherein msgA at least carries information on the preamble and Msg3 in the four-step random access; and the network device transmits msgB to the terminal equipment, wherein msgB at least carries information on the RAR and Msg4 in the four-step random access.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

It was found by the inventors that for the two-step random access, how to define a mapping relationship between the preambles and uplink data resources and demodulation reference signals (DM-RS) is still an open question till now, and there exists no effective solutions therefor.

Addressed to at least one of the above problems, embodiments of this disclosure provide a random access method and apparatus.

According to a first aspect of the embodiments of this disclosure, there is provided a random access method, including:
transmitting a first random access request at least including a preamble, uplink data and a demodulation reference signal by a terminal equipment to a network device; wherein mapping of the preamble to an uplink data channel resource of the uplink data and a demodulation reference signal port of the demodulation reference signal is determined according to configuration information from the network device or is configured by the network device; and
receiving a random access response transmitted by the network device.

According to a second aspect of the embodiments of this disclosure, there is provided a random access apparatus, including:
a transmitting unit configured to transmit a first random access request at least including a preamble, uplink data and a demodulation reference signal to a network device; wherein mapping of the preamble to an uplink data channel resource of the uplink data and a demodulation reference signal port of the demodulation reference signal is determined according to configuration information from the network device or is configured by the network device; and
a receiving unit configured to receive a random access response transmitted by the network device.

According to a third aspect of the embodiments of this disclosure, there is provided a random access method, including:
receiving a first random access request at least including a preamble, uplink data and a demodulation reference signal transmitted by a terminal equipment; wherein mapping of the preamble to an uplink data channel resource of the uplink data and a demodulation reference signal port of the demodulation reference signal is determined according to configuration information or is configured by the network device; and
transmitting a random access response to the terminal equipment.

According to a fourth aspect of the embodiments of this disclosure, there is provided a random access apparatus, including:
a receiving unit configured to receive a first random access request at least including a preamble, uplink data and a demodulation reference signal transmitted by a terminal equipment; wherein mapping of the preamble to an uplink data channel resource of the uplink data and a demodulation reference signal port of the demodulation reference signal is determined according to configuration information or is configured by the network device; and
a transmitting unit configured to transmit a random access response to the terminal equipment.

According to a fifth aspect of the embodiments of this disclosure, there is provided a communication system, including:
a terminal equipment configured to transmit a first random access request at least including a preamble, uplink data and a demodulation reference signal to a network device, and receive a random access response transmitted by the network device; and the network device configured to receive the first random access request and transmit the random access response to the terminal equipment; wherein mapping of the preamble to an uplink data channel resource of the uplink data and a demodulation reference signal port of the demodulation reference signal is determined according to configuration information from the network device or is configured by the network device.

An advantage of the embodiments of this disclosure exists in that the mapping of the preamble to the uplink data channel resource and the demodulation reference signal port is implicitly configured or is configured explicitly by the network device according to the configuration information. Thus, the mapping relationship between the preamble and the uplink data resource and the DM-RS port may be determined, and the network device may immediately obtain the PUSCH and DM-RS information associated with it based on the received preamble, which may not only improve a random access performance, but also provide sufficient configuration flexibility.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 3 is a schematic diagram of a communication system of an embodiment of this disclosure;

FIG. 4 is a schematic diagram of the random access method of an embodiment of this disclosure;

DETAILED DESCRIPTION OF THE DISCLOSURE

Figure 1:
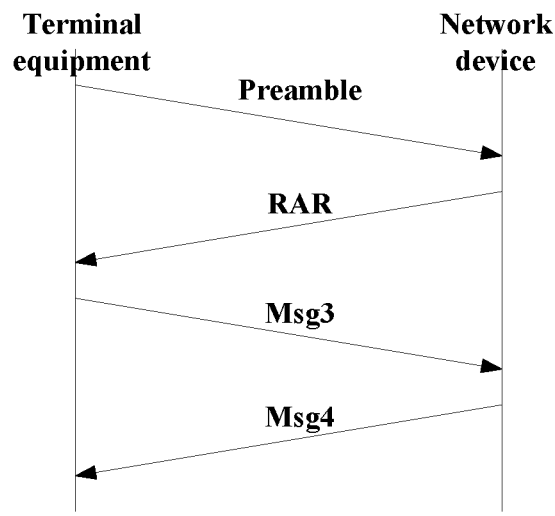
FIG. 1 is schematic diagram of a random access process of LTE.
Figure 2:
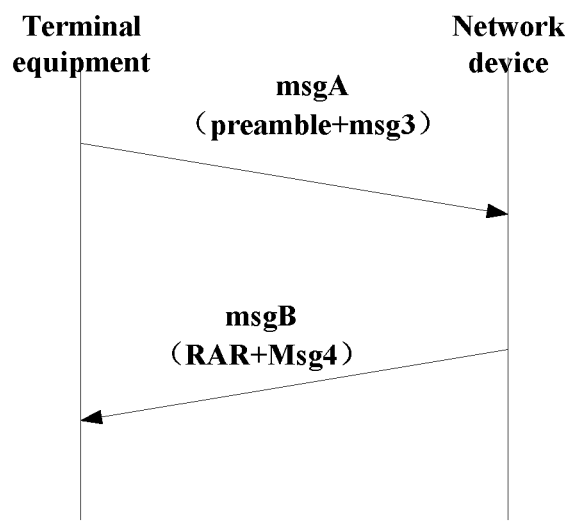
FIG. 2 is a schematic diagram of the random access process of NR.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Furthermore, the term "network side" or "network device side" refers to a side of a network, which may be a base station, or may include one or more of the above network devices. And the term "user side" or "terminal side" or "terminal equipment side" refers to a side of a user or a terminal, which may be a UE, or may include one or more of the above terminal equipments.

Scenarios in the embodiments of this disclosure shall be described below by way of examples; however, this disclosure is not limited thereto.

FIG. 3 is a schematic diagram of a communication system of an embodiment of this disclosure, in which a case where terminal equipments and a network device are taken as examples is schematically shown. As shown in FIG. 3, a communication system 100 may include a network device 101 and terminal equipments 102, 103. For the sake of simplicity, an example having only two terminal equipments and one network device is schematically given in FIG. 3; however, the embodiment of this disclosure is not limited thereto.

In the embodiment of this disclosure, existing traffics or traffics that may be implemented in the future may be performed between the network device 101 and the terminal equipments 102, 103. For example, such traffics may include but not limited to enhanced mobile broadband (eMBB), massive machine type communication (MTC), and ultra-reliable and low-latency communication (URLLC), etc.

It should be noted that FIG. 3 shows that two terminal equipments 102 and 103 are both within the coverage of the network device 101; however, the embodiment of this disclosure is not limited thereto. The two terminal equipments 102 and 103 may not be within the coverage of the network device 101, or one terminal equipment 102 is within the coverage of the network device 101 and the other terminal equipment 103 is outside the coverage of the network device 101.

Two-step random access is one of the work item studies of NR Rel-16. A physical random access channel (PRACH) occasion is defined in NR Rel-15, which is a time-frequency resource containing a number of preambles (including preamble resources or preambles that may be used to transmit preamble codes), and different PRACH occasions may be frequency division multiplexing or time division multiplexing. Within a PRACH occasion, multiple preambles are multiplexed in a code division multiplexing manner.

The two-step random access follows the definition of the PRACH occasion, and defines the PUSCH occasion in a similar manner. A PUSCH occasion is a time-frequency resource containing a number of PUSCH resources, wherein the PUSCH resource refers to a time-frequency resource where a PUSCH capable of transmitting uplink data in an msgA is located, and the PUSCH occasion may include multiple above-mentioned PUSCH resources.

For the design of the physical layer of two-step random access, what is important is that after identifying a preamble, the network device needs to be able to know where to demodulate the PUSCH of msgA and which DM-RS is based on in channel estimation, hence, a mapping relationship between the preamble and the PUSCH resource and DM-RS port needs to be defined, so that the network device may immediately obtain information on PUSCH and DM-RS associated with it based on the received preamble with no need of blind detection. Currently, how to define a mapping relationship between preamble and PUSCH resource and DM-RS port is still an open issue.

Embodiments of this disclosure provide a random access scheme to determine a mapping relationship between preamble and PUSCH resource and DM-RS port. The mapping relationship may be attributed to mapping between the preamble and a tuple of (the PUSCH resource and DM-RS port), thereby providing sufficient configuration flexibility; mapping a preamble to a tuple may be supported, and mapping a preamble to multiple tuples may also be supported so as to meet different application demands and achieve a reasonable tradeoff between random access performance and resource utilization. In addition, the random access performance may further be improved via flexible DM-RS configuration, PUSCH grouping and switching of four-step random access and two-step random access.

In the following description, some concepts are not strictly distinguished without causing confusion. For example, "an uplink data channel" and "a PUSCH" may be interchanged, and "a preamble" and "preamble code" or "a preamble resource" may be interchanged, and "a random access channel" and "a PRACH" may be interchanged.

Embodiment 1

The embodiments of this disclosure provide a random access method, which shall be described from a terminal equipment side. FIG. 4 is a schematic diagram of the random access method of the embodiment of this disclosure. As shown in FIG. 4, the method includes:

step 401: a terminal equipment transmits a first random access request at least including a preamble, uplink data and a demodulation reference signal to a network device; wherein mapping of the preamble to an uplink data channel resource of the uplink data and a demodulation reference signal port of the demodulation reference signal is determined according to configuration information from the network device or is configured by the network device; and step 402: the terminal equipment receives a random access response transmitted by the network device.

In the embodiments of this disclosure, a preamble may be mapped to at least one tuple of the uplink data channel resources and the demodulation reference signal ports, the tuple being expressed as (PUSCH resources, DM-RS ports), for example, and an uplink data channel resource being at least configured with a demodulation reference signal port.

In an embodiment, the mapping may be implicitly configured based on the configuration information from the network device (such as configuration information of the preambles, uplink data channel resources and demodulation reference signal ports), so that both the terminal equipment and the network device may determine the mapping. The mapping may also be explicitly configured by the network device for the terminal equipment.

Figure 5:
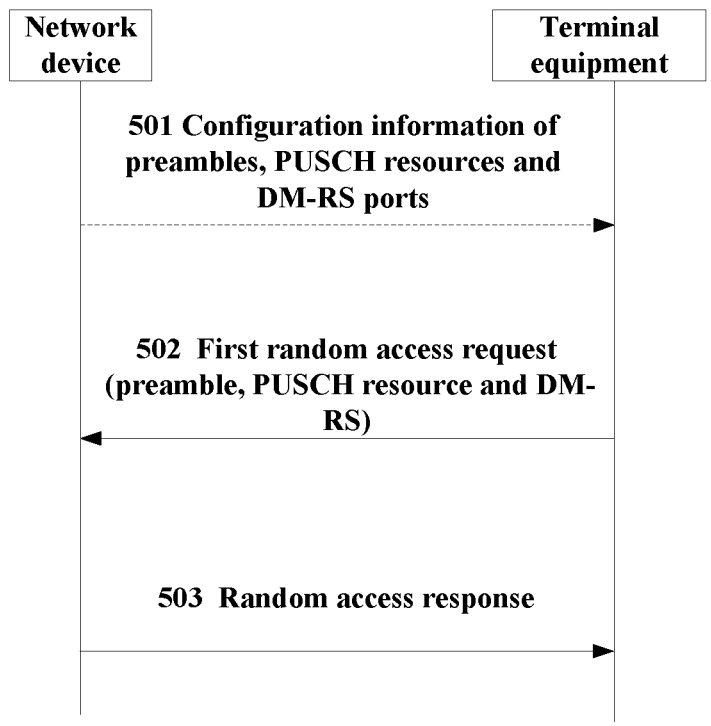
FIG. 5 is another schematic diagram of the random access method of the embodiment of this disclosure.

FIG. 5 is another schematic diagram of the random access method of the embodiment of this disclosure, which illustrates interaction between the network device and the terminal equipment. As shown in FIG. 5, the random access method includes:

step 501: the network device configures preambles, uplink data channel resources and demodulation reference signal ports for the terminal equipment; furthermore, the network device may not explicitly configure the mapping, but the terminal equipment implicitly determines the mapping according to the following various embodiments, or the network device may also explicitly configure the mapping;

step 502: the terminal equipment transmits a first random access request at least including a preamble, uplink data and a demodulation reference signal to the network device; and step 503: the terminal equipment receives the random access response transmitted by the network device.

In step 501, preambles, PUSCH resources and DM-RS ports of two-step random access may be configured by the network device to the terminal equipment via a broadcast message, such as a system information block (SIB), or a main information block (MIB), or radio resource control (RRC) signaling. And the network device may achieve a desired mapping relationship by controlling the number of configured PUSCH resources, the number of the configured DM-RS ports and the number of configured preambles.

It should be noted that FIG. 4 or 5 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 4 or 5.

In an embodiment, the preambles are mapped in the following manner: mapping one or more of the demodulation reference signal ports of one of uplink data channel resources in an incremental order of indices first, and then mapping one or more of the uplink data channel resources in an incremental order of frequencies.

Figure 6:
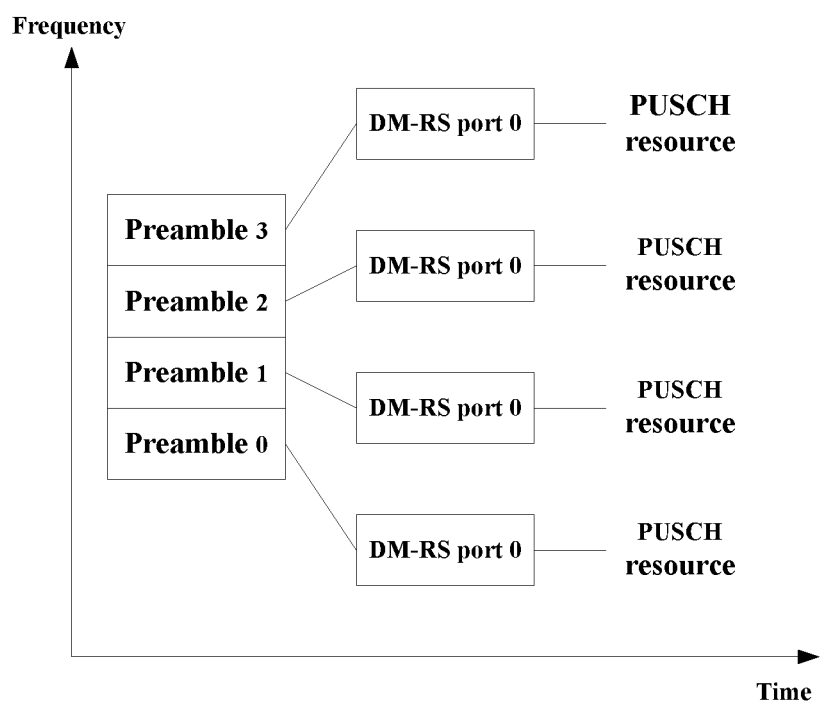
FIG. 6 is an exemplary diagram of resource mapping of the embodiment of this disclosure.

FIG. 6 is an exemplary diagram of resource mapping of the embodiment of this disclosure. As shown in FIG. 6, the network device configures N=4 preambles, configures R=4 PUSCH resources, and configures P=1 DM-RS port for each PUSCH resource.

According to the above mapping order, the preambles are increased according to frequencies, that is, from preamble 0 to preamble 3; the (PUSCH resources, DM-RS ports) tuple is in the following order: mapping in a PUSCH resource in an incremental order of indices of the DM-RS ports first, and then mapping frequency division multiplexed PUSCH resources in an incremental order of the frequencies. Hence, the mapping in FIG. 6 may be obtained, wherein a preamble is mapped onto a PUSCH resource and a DM-RS port, that is, a preamble is mapped onto a (PUSCH resources, DM-RS ports) tuple.

Each PUSCH resource may be independently configured with a DM-RS port, and may be configured with any DM-RS port index. As there is no performance difference between uses of configured DM-RS ports, for the sake of simplicity, DM-RS Port 0 is configured in FIG. 6.

Sizes of the PUSCH resources may be configured to be identical or different, and the PUSCH resources are configured as having identical sizes in FIG. 6, so that the terminal equipment may select the preambles with equal probabilities, and a preference of the terminal equipment for preamble selection will not be caused by different sizes of the PUSCH resources, hence, a probability of conflicts on a part of the preambles and a part of the PUSCH resources will not be increased.

For the configured number of PUSCH resources, they may be configured to be consecutive with each other when conditions permit, which may reduce frequency resource fragments and limit the PUSCH resources to a limited range, and resources outside the range may be used for other purposes.

Figure 7:
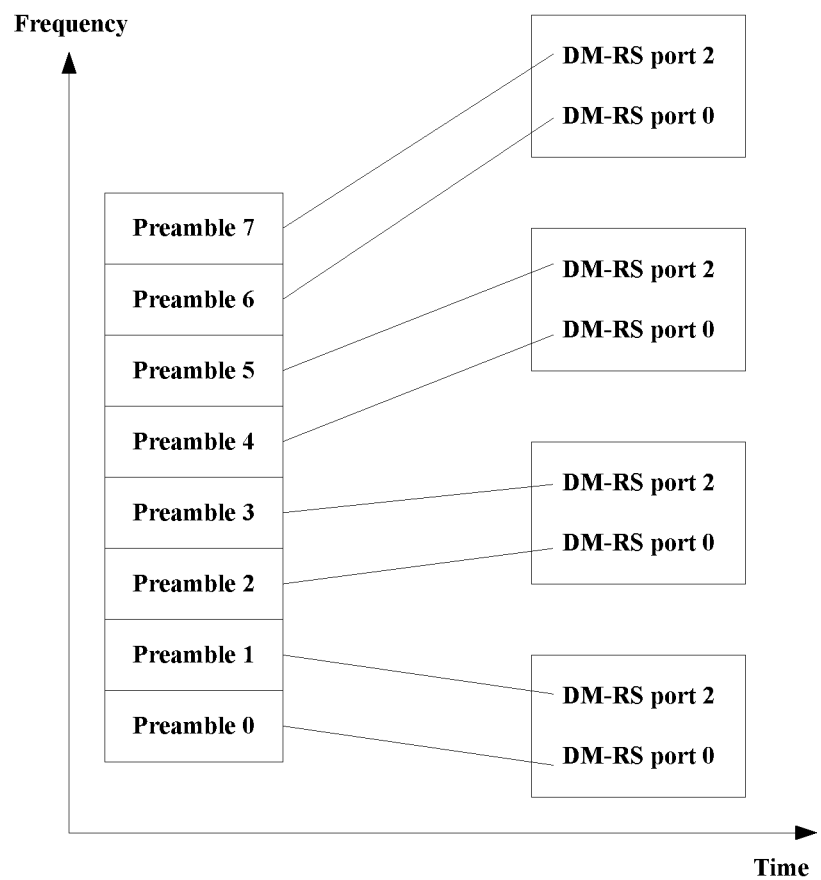
FIG. 7 is another exemplary diagram of the resource mapping of the embodiment of this disclosure.

FIG. 7 is another exemplary diagram of the resource mapping of the embodiment of this disclosure. As shown in FIG. 7, the network device configures N=8 preambles, configures R=4 PUSCH resources, and configures P=2 DM-RS ports for each PUSCH resource.

According to the above mapping order, the mapping in FIG. 7 may be obtained, in which one preamble is mapped to one PUSCH resource and one DM-RS port, that is, one preamble is mapped to one (PUSCH resources, DM-RS ports) tuple. Different preambles may be mapped to identical PUSCH resources, that is, PUSCH resources to which different preambles correspond overlap (or coincide) with each other, but different preambles are mapped to different DM-RS ports, hence, different preambles are still mapped to different (PUSCH resources, DM-RS ports) tuples.

When network device uses a more advanced receiver (such as a receiver having a function of interference cancellation), even if two PUSCH resources overlap, as long as DM-RS ports associated with the two PUSCH resources are different, the network device may still successfully demodulate the two PUSCHs in some cases. Even if the network device does not use a more advanced receiver, when two PUSCH resources overlap, but DM-RS ports associated therewith are different, the network device may still successfully demodulate a PUSCH in some cases.

By configuring multiple DM-RS ports for a PUSCH resource, different preambles may be mapped to identical (or overlapped) PUSCH resources, thereby improving resource utilization. For example, 8 preambles are configured in FIG. 7, but only 4 PUSCH resources are configured instead of 8 PUSCH resources. And more DM-RS ports may be configured for each PUSCH resource.

Configuring two DM-RS ports is taken as an example in FIG. 7. As the receiver is unable to distinguish and demodulate any number of overlapped PUSCHs, considering an ability of the receiver in an actual system, configuring two DM-RS ports may achieve an effective tradeoff between demodulation and decoding performance and resource utilization. Any two DM-RS ports may be configured for the PUSCH resources.

In an embodiment, one of the uplink data channel resources is configured with a frequency division multiplexed first demodulation reference signal port and second demodulation reference signal port. As an implementation, FIG. 7 configures DM-RS port 0 and port 2 for the PUSCH resources. This is because that DM-RS port 0 and port 2 are two ports multiplexed in a frequency division multiplexing manner, and in comparison with two ports multiplexed in a code division multiplexing manner (such as DM-RS port 0 and port 1), the frequency division multiplexing manner is more robustness for non-ideal factors in the two-step random access, such as asynchronization, and power imbalance, etc.

In an embodiment, configuration type 1 of the demodulation reference signals is used, and the first demodulation reference signal port and the second demodulation reference signal port (such as DM-RS port 0 and DM-RS port 2) occupy completely 12 subcarriers in the frequency domain in a resource block (RB).

For example, in configuring two DM-RS ports, DM-RS configuration type 1 may further be configured and used. For DM-RS configuration type 1, each DM-RS port occupies 6 resource elements (REs) in 1 RB and 1 symbol (an OFDM symbol or DFT-s-OFDM symbol), that is, occupying 6 subcarriers in the frequency domain in 1 RB, hence, DM-RS port 0 and DM-RS port 2 will occupy completely 12 REs in the frequency domain in 1 RB and 1 symbol, that is, occupying completely 12 subcarriers in the frequency domain in 1 RB, which has a higher DM-RS density than DM-RS configuration type 2, and helps improving accuracy of channel estimation.

In an embodiment, one of the uplink data channel resources is configured with a code division multiplexed third demodulation reference signal port and fourth demodulation reference signal port. As an implementation, DM-RS port 0 and DM-RS port 1 may be configured, that is, DM-RS ports that are multiplexed in a code division multiplexing manner may be configured.

For example, considering that a PUSCH may also use a discrete Fourier transform spread orthogonal frequency division multiplex (DFT-s-OFDM) waveform, the use of two frequency division multiplexed DM-RS ports (DM-RS port 0 and port 2) will cause mapping of REs in a symbol where the DM-RSs are located to be discontinuous, thereby affecting a single-carrier characteristic. Conversely, if code division multiplexed DM-RS port 0 and port 1 are used, remaining REs in the symbol where the DM-RSs are located may be used for PUSCH transmission, thereby keeping continuity of mapping of the REs.

In an embodiment, when the uplink data use an orthogonal frequency division multiplex (OFDM) waveform, the frequency division multiplexed first demodulation reference signal port and second demodulation reference signal port are used; and when the uplink data use the DFT-S-OFDM waveform, the code division multiplexed third demodulation reference signal port and fourth demodulation reference signal port are used. As an implementation, when more than two available DM-RS ports are configured, the frequency division multiplexed DM-RS ports are preferentially selected and used.

Figure 8:
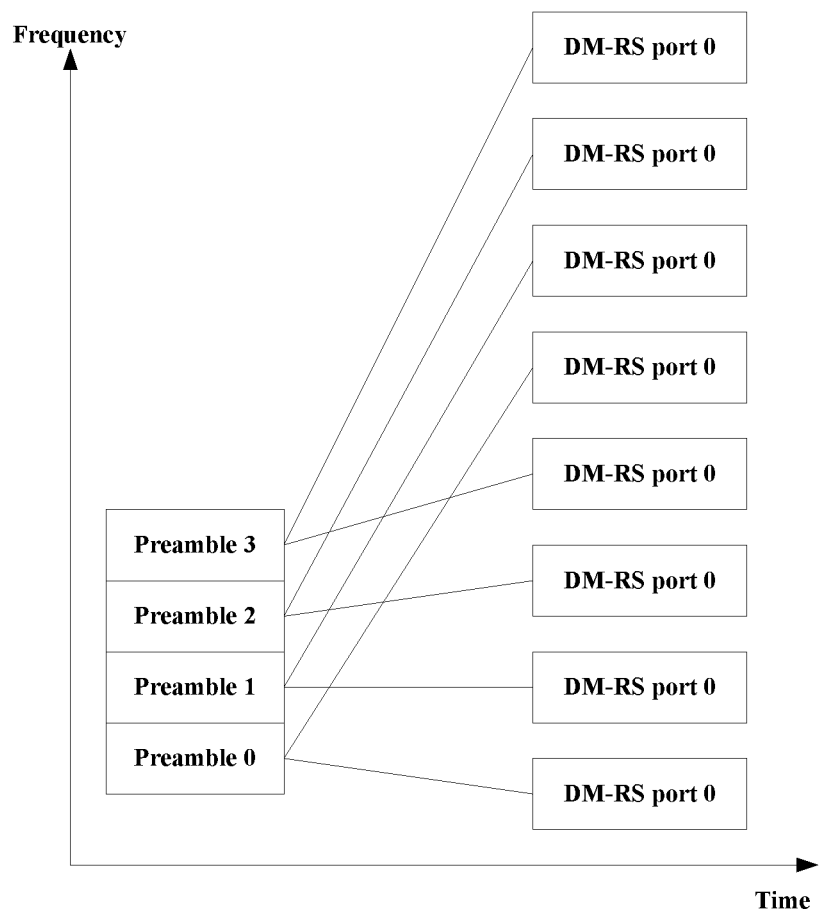
FIG. 8 is a further exemplary diagram of the resource mapping of the embodiment of this disclosure.

FIG. 8 is a further exemplary diagram of the resource mapping of the embodiment of this disclosure. As shown in FIG. 8, the network device configures N=4 preambles, configures R=8 PUSCH resources, and configures P=1 DM-RS port for each PUSCH resource.

According to the above mapping order, the mapping in FIG. 8 may be obtained, wherein a preamble is mapped to two PUSCH resources, and is mapped to one DM-RS port in each PUSCH resource, that is, one preamble is mapped to two (PUSCH resources, DM-RS ports) tuples.

The mapping in FIG. 8 is beneficial to further avoiding collision to some extent. For example, even if both terminal equipment A and terminal equipment B select the preamble 0, the two terminal equipments have a probability to select different PUSCH resources, so as to avoid collision.

In an embodiment, multiple uplink data channel resources are at least configured as a first group and a second group, and one uplink data channel resource is configured with at least one demodulation reference signal port. Furthermore, a size of the uplink data channel resource of the second group may be greater than a size of the uplink data channel resource of the first group.

Figure 9:
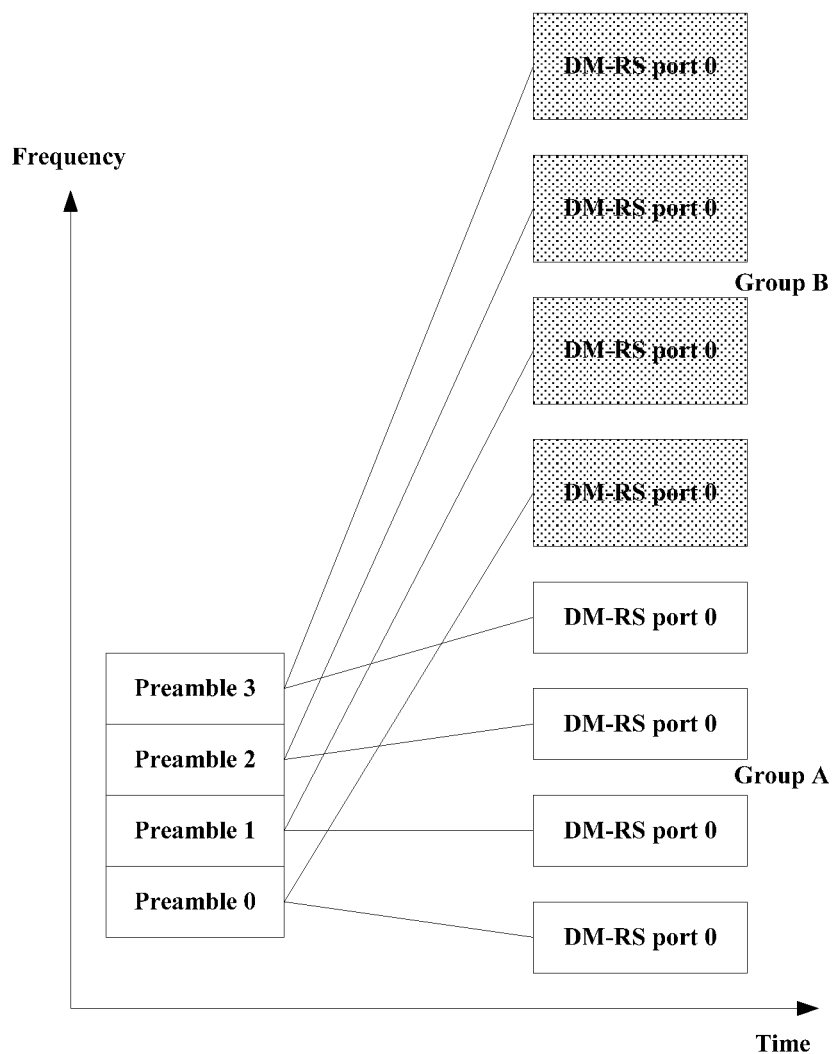
FIG. 9 is still another exemplary diagram of the resource mapping of the embodiment of this disclosure.

FIG. 9 is still another exemplary diagram of the resource mapping of the embodiment of this disclosure, with a difference from FIG. 8 being that the network device configures two groups of PUSCH resources, first group (group A) and a second group (group B), PUSCH resources of group A and group B have different sizes, and the PUSCH resource of group B in FIG. 9 has a larger size or a lower modulation scheme.

Taking a size as an example, reserving a large-sized PUSCH resource may provide users with link adaptation of a certain degree. For example, when payload needing to be transmitted by the terminal equipment is relatively large, the terminal equipment may use a large-sized PUSCH resource to carry the payload. If the PUSCH resource group B with a larger size is configured, the terminal equipment may select PUSCH resource group B when at least one of the following conditions is satisfied that:

the random access request is addressed to a common control channel (CCCH), and a size of a service data unit (SDU) of the common control channel plus a size of a media access control (MAC) subheader is greater than a first threshold;

a size of the random access request is greater than a second threshold, and/or a pathloss and/or reference signal received power (RSRP) of the random access request is/are less than a third threshold, and the size of the random access request, such as referring to a potential size of msgA, includes a packet that may be used for uplink transmission, an MAC sub-header, and an MAC control element (CE) that may be needed;

the terminal equipment is in an RRC connected state and has user plane (UP) data to be transmitted, and optionally, a size of a payload of the user plane data is greater than a threshold;

a PUSCH transmission block error rate (BLER) requirement, for example, the block error rate is greater than a fourth threshold;

reference signal received power (RSRP) is less than a fifth threshold; and a signal noise rate (SNR) or a signal to interference plus noise rate (SINR) is less than a sixth threshold.

By defining the conditions for the terminal equipment to select group B, the terminal equipment may be prevented from deliberately selecting a PUSCH resource with a large size, thereby avoiding the terminal equipment from being overcrowded in the PUSCH resource with a large size. In addition, the terminal equipment is also with a freedom in performing link adaptation.

In addition, there is no restriction on positions of group A and group B, FIG. 9 is illustrative only, and the PUSCH resources of group A and group B may appear alternately or in any other manner. The above two PUSCH resource groups are taken as an example, and more PUSCH resource groups may be configured as needed.

Different PUSCH resource groups having different sizes is taken as an example above only, and the different PUSCH resource groups may also have other different parameters, including at least one of a modulation scheme, a code rate, a waveform, and DM-RS configuration.

In an embodiment, the preambles mapped to the uplink data channel resources of the first group may be identical to the preambles mapped to the uplink data channel resources of the second group, or, the preambles mapped to the uplink data channel resources of the first group may be different from the preambles mapped to the uplink data channel resources of the second group.

Figure 10:
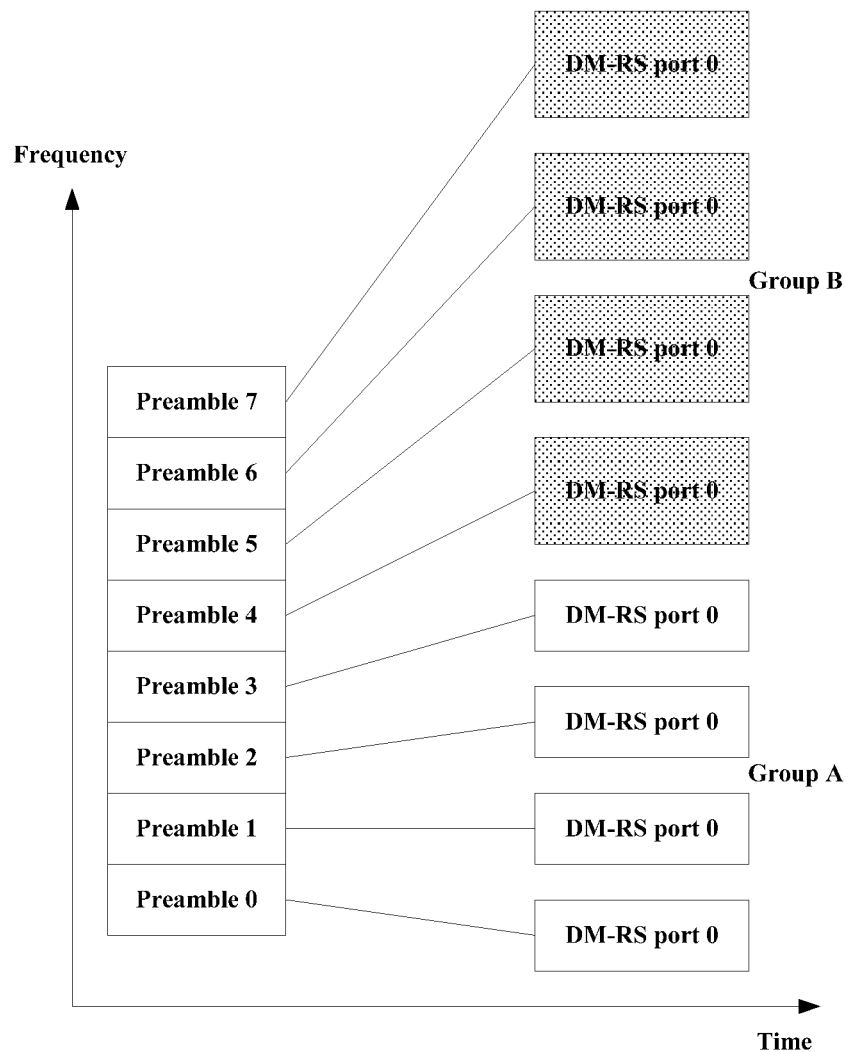
FIG. 10 is still another exemplary diagram of the resource mapping of the embodiment of this disclosure.

FIG. 10 is still another exemplary diagram of the resource mapping of the embodiment of this disclosure, with a difference from FIG. 9 being that PUSCH resource group A is mapped to a preamble different from group B, that is, one preamble is mapped to one (PUSCH resources, DM-RS ports) tuple. By additionally configuring a larger number of preambles, a probability of collision may further be reduced. The above rules for selecting group B are also applicable to FIG. 10. FIG. 10 is also beneficial to supporting link adaptation.

Figure 11:
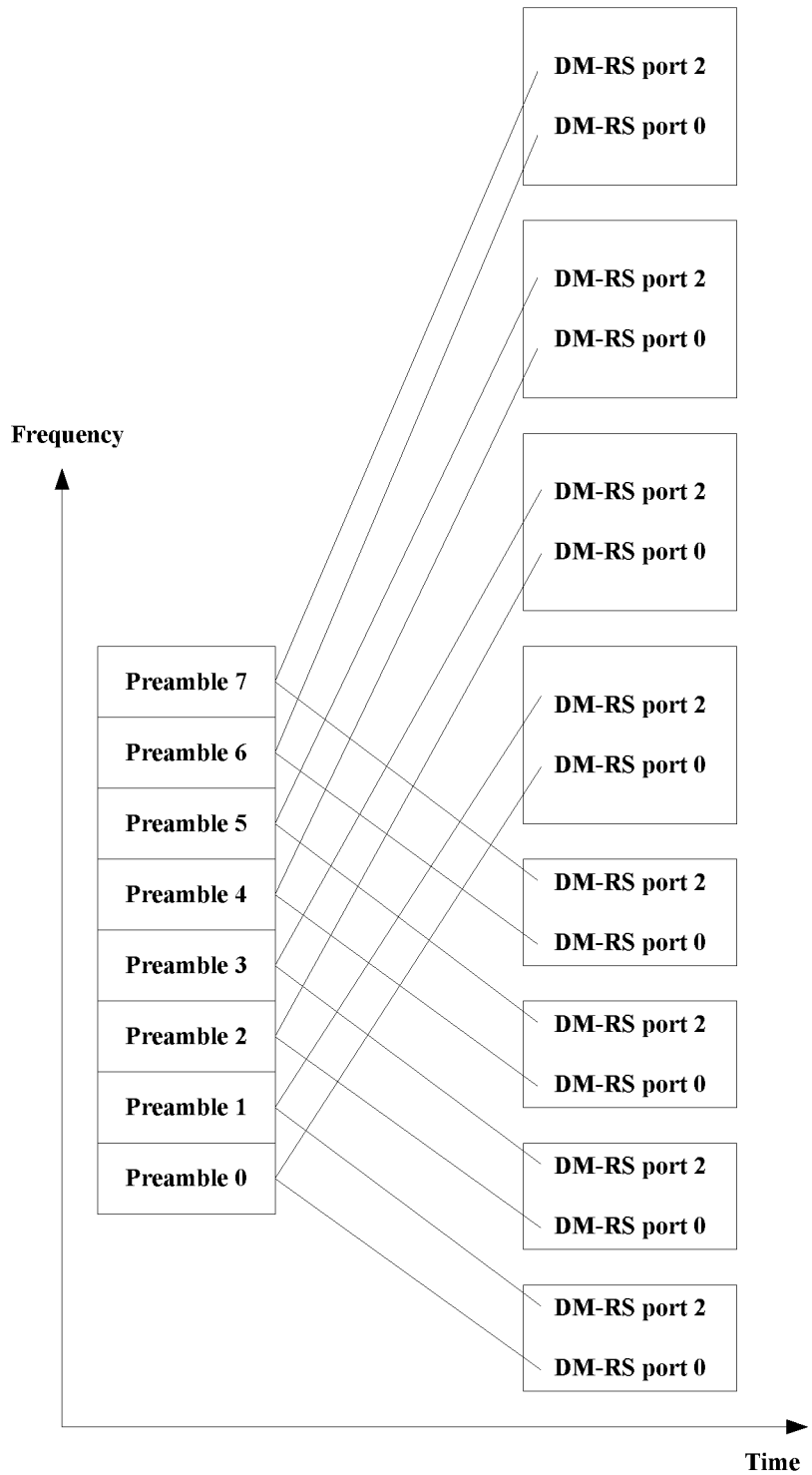
FIG. 11 is still another exemplary diagram of the resource mapping of the embodiment of this disclosure.

FIG. 11 is still another exemplary diagram of the resource mapping of the embodiment of this disclosure. As shown in FIG. 11, the network device configures N=8 preambles, configures R=8 PUSCH resources, and configures P=2 DM-RS ports for each PUSCH resource. According to the above mapping order, the mapping in FIG. 11 may be obtained, in which one preamble is mapped to two PUSCH resources, and is mapped to a DM-RS port in each PUSCH resource.

In comparison with FIG. 7, one preamble in FIG. 11 is mapped to two (PUSCH resources, DM-RS ports) tuples, with a difference from FIG. 9 being that two DM-RS ports are configured in each PUSCH resource in FIG. 11. The DM-RS selection method in FIG. 7 is also applicable to FIG. 11, and the rules for selecting group B in FIG. 9 are also applicable to FIG. 11.

Figure 12:
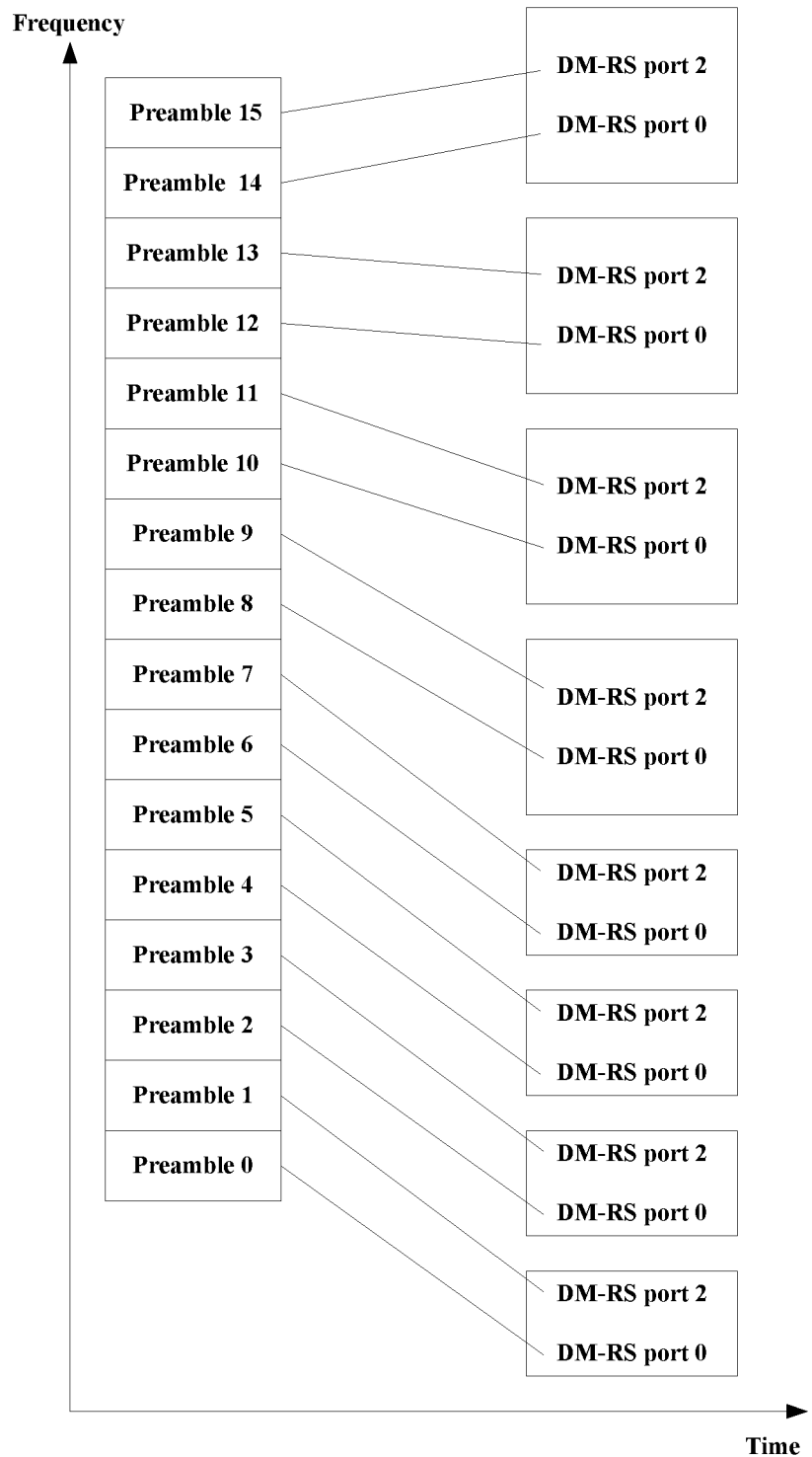
FIG. 12 is still another exemplary diagram of the resource mapping of the embodiment of this disclosure.

FIG. 12 is still another exemplary diagram of the resource mapping of the embodiment of this disclosure, with a difference from FIG. 11 being that PUSCH resource group A is mapped to preambles different from group B, that is, one preamble is mapped to one (PUSCH resources, DM-RS ports) tuple. In comparison with FIG. 11, by additionally configuring a larger number of preambles, a probability of collision may further be reduced. The above method for selecting DM-RSs and rules for selecting group B are also applicable to FIG. 12.

Since the network device may control the number of configured preambles and the number of (PUSCH resources, DM-RS ports), in configuring, the network device may make the number of preambles equal to the number of (PUSCH resource, DM-RS port) during configuration, thereby achieving one-to-one mapping of the preambles and the (PUSCH resources, DM-RS ports); or may configure that the number of configured preambles is less than the number of (PUSCH resources, DM-RS ports), thereby achieving one-to-many mapping of the preambles and the (PUSCH resources, DM-RS ports). For example, it may configure that the number of (PUSCH resources, DM-RS ports) is an integer multiple of the number of the preambles.

In addition, network device is not expected to configure that the number of the preambles to be greater than the number of (PUSCH resources, DM-RS ports); because in this case, even if different preambles are selected, (PUSCH resources, DM-RS ports) collisions may still occur, and such collisions are actually unnecessary and may be avoided through configuration.

If the network device does not control the relationship between the number of the preambles and the number of (PUSCH resources, DM-RS ports), that is, the number of the preambles and the number of (PUSCH resources, DM-RS ports) are configured independently, it may occur that no mapping relationship is established for some (PUSCH resources, DM-RS ports) or preambles, and the above-described one-to-one mapping relationship and one-to-many mapping relationship cannot be ensured. In the cases, following mapping method may be used.

In an embodiment, one of the preambles is mapped to r ($r \geq 1$) of the uplink data channel resources, and the preamble is mapped to p ($p \geq 1$) demodulation reference signal ports in each of the uplink data channel resources; and the one of the preambles is mapped in a manner as follows: mapping the preamble within the r uplink data channel resources in an incremental order of indices of the demodulation reference signal ports first, then mapping the preamble within R ($R \geq r$) uplink data channel resources in an incremental order of frequencies of the uplink data channel resources.

For example, R PUSCH resources included in a PUSCH occasion are configured, and the number of DM-RS ports allowed to be used in each PUSCH resource is configure as P. One PUSCH occasion is configured to have a mapping relationship with N preamble resources. Each preamble is configured to be mapped to r PUSCH resources, and the preamble is configured to be mapped to p DM-RS ports within each PUSCH resource.

The preambles are mapped to the PUSCH resources and DM-RS ports in the following order: mapping the preambles in the r PUSCH resources in an incremental order of the DM-RS ports first, and then mapping the preambles in the R PUSCH resources in an incremental order of the frequencies of the PUSCH resources.

In an embodiment, when a tuple of the uplink data channel resources and the demodulation reference signal ports is not mapped to the preamble, the tuple is determined not to be used for the first random access request, and/or when one of preambles is not mapped to the tuple of the uplink data channel resources and the demodulation reference signal ports, a second random access request including the preamble but not including the uplink data and the demodulation reference signals is transmitted.

For example, if a (PUSCH resources, DM-RS ports) tuple is not mapped to and associated with the preambles, this tuple is not used for PUSCH transmission of the two-step random access. If a preamble is not mapped to and associated with the (PUSCH resources, DM-RS ports) tuple, the preamble is not used for preamble transmission of the two-step random access, and the preamble may be used for preamble transmission of the four-step random access. For such mapping, the method for selecting the DM-RSs and the rules for selecting group B are also applicable.

When PUSCH resources are grouped, they may also be mapped to the preambles group by group. For example, the (PUSCH resources, DM-RS ports) in group A are mapped to the preambles first, and then the (PUSCH resources, DM-RS ports) in group B are mapped to the preambles, and any of the above-mentioned mapping methods may be used for the mapping from (PUSCH resources, DM-RS ports) in each group to the preambles.

In an embodiment, the uplink data channel resources of the first group overlap with the uplink data channel resources of the second group, and the overlapped uplink data channel resources are configured with different demodulation reference signal ports.

Figure 13:
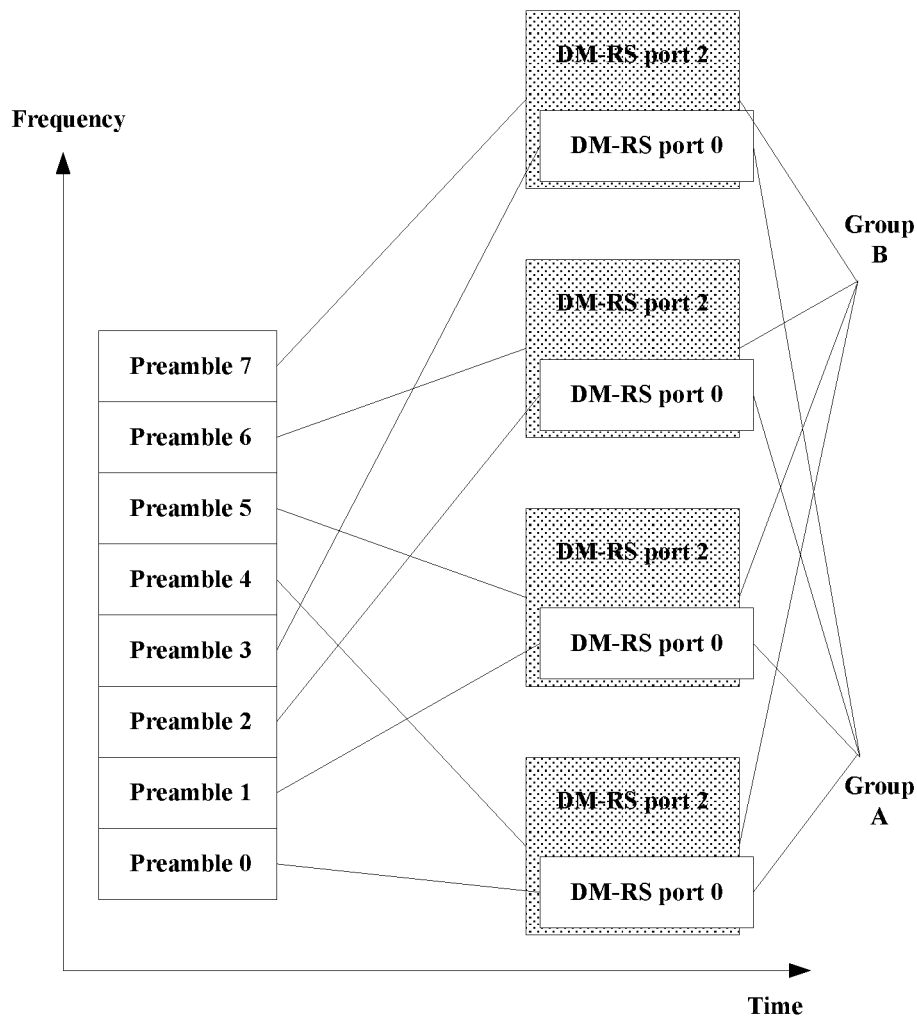
FIG. 13 is still another exemplary diagram of the resource mapping of the embodiment of this disclosure.

FIG. 13 is still another exemplary diagram of the resource mapping of the embodiment of this disclosure. As shown in FIG. 13, the configured PUSCH resource group A and group B may overlap, so that PUSCH resources may be saved. The overlapped PUSCH resources are configured with different DM-RS ports.

In an embodiment, the preambles may be mapped in a group first, and then multiple groups may be mapped in an incremental order of indices of the groups. That is, the preambles may also be mapped group by group.

As shown in FIG. 13, the preambles may be mapped group by group. For example, the (PUSCH resources, DM-RS ports) in group A are mapped to the preambles first, and then the (PUSCH resources, DM-RS ports) in group B are mapped to the preambles, and any of the above mapping methods may be used for the mapping from (PUSCH resources, DM-RS ports) in each group to the preambles. The mapping of the groups FIG. 13 is described by taking overlapping of the resources as an example. However, this disclosure is not limited thereto, and for multiple groups where PUSCH resources do not overlap, the above method of group mapping may also be used.

In an embodiment, one or more of the preambles are configured in at least one random access channel occasion, and one or more of the uplink data channel resources and one or more of the demodulation reference signal ports are configured in at least one uplink data channel occasion.

As a PUSCH occasion and PRACH occasion are defined, there exists also a mapping relationship between the PRACH occasion and the PUSCH occasion. When there exists a one-to-one mapping relationship between PRACH occasion and the PUSCH occasion, within a pair of the PRACH occasion and the PUSCH occasion associated by the mapping relationship, according to the above rules for mapping between preambles and the (PUSCH resources, DM-RS ports) tuples, a mapping relationship between the preamble and the PUSCH resource and the DM-RS port is determined. And the above method for selecting the DM-RSs and the rules for selecting group B are both applicable.

In an embodiment, the preambles in the one random access channel occasion may be mapped to one uplink data channel occasion; and the preambles are mapped in one uplink data channel occasion first, and then mapped in one or more of the above uplink data channel occasions in an incremental order of the frequencies.

For example, as an implementation, the order of mapping the preambles to the PUSCH resources and the DM-RS ports may be extended to: mapping in a PUSCH resource in an incremental order of the indices of the DM-RS ports first, then mapping the frequency division multiplexed PUSCH resources in a PUSCH occasion in an incremental order of the frequencies, and finally mapping multiple frequency division multiplexed PUSCH occasions in an incremental order of the frequencies.

As an implementation, the order of mapping the preambles to the PUSCH resources and the DM-RS ports may also be extended to: in a PUSCH occasion, mapping in an incremental order of the DM-RS ports in r (r≥1) PUSCH resources first, then in a PUSCH occasion, mapping in an incremental order of the frequencies of the PUSCH resources in R (R≥r) PUSCH resources, and finally mapping multiple frequency division multiplexed PUSCH occasions in an incremental order of the frequencies.

Figure 14:
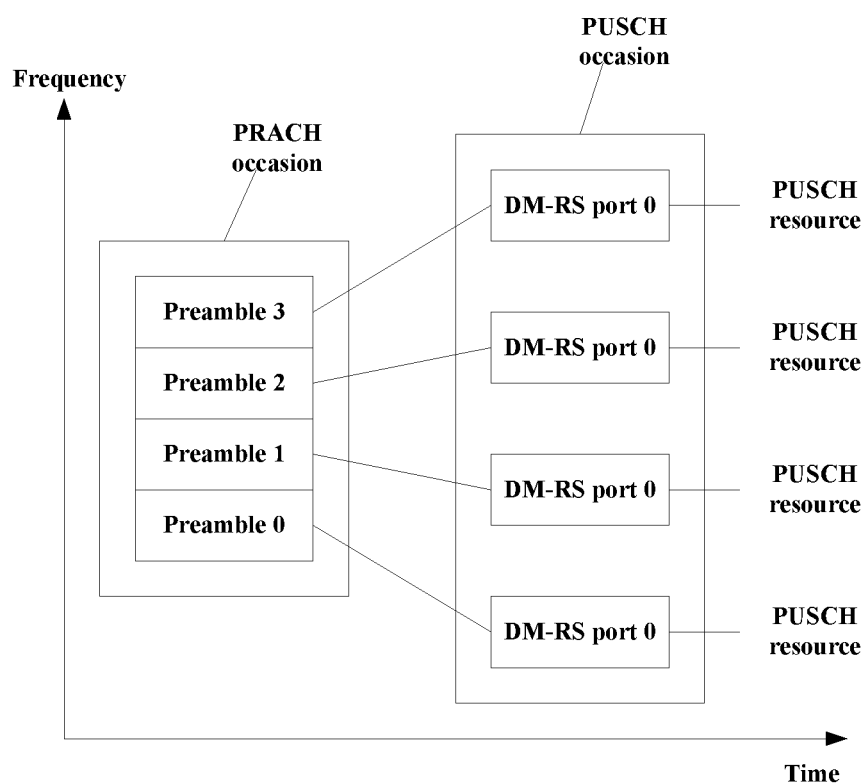
FIG. 14 is still another exemplary diagram of the resource mapping of the embodiment of this disclosure.

FIG. 14 is still another exemplary diagram of the resource mapping of the embodiment of this disclosure. As shown in FIG. 14, the network device configures PRACH occasions and PUSCH occasions, in which one PRACH occasion is associated with one PUSCH occasion. And the network device configures a number of PUSCH resources and DM-RS ports in the PUSCH occasions.

Within this pair of associated PRACH occasion and PUSCH occasion, the mapping between the preambles and the PUSCH resources and the DM-RS ports shown in FIG. 14 may be obtained according to the mapping order described above. Likewise, other mapping relationships may be obtained, which shall not be described herein any further.

In an embodiment, in configuring the uplink data channel resources in the uplink data channel occasion, relative positions of the uplink data channel resources in the uplink data channel occasion is indicated.

For example, as the PUSCH occasions are configured and then the PUSCH resources are further configured within the range of the time-frequency resources contained in the PUSCH occasions, for frequency domain resource allocation of the PUSCH resources, its configuration signaling may actually take the PUSCH occasions as a reference to indicate the relative positions of PUSCH resources in the PUSCH occasions. As what is indicated is the relative positions in the PUSCH occasions, in comparison with the conventionally indicated relative positions in an entire bandwidth or a bandwidth part (BWP), its signaling overhead will be greatly lowered.

The network device may also configure multiple PRACH occasions and multiple PUSCH occasions, and the mapping of the preambles and the (PUSCH resources, DM-RS ports) is determined in the above manner within each pair of associated PRACH occasion and PUSCH occasion.

In an embodiment, multiple uplink data channel occasions may at least be configured as a third group and a fourth group. And parameters of at least one of a size, a modulation scheme, a code rate, a waveform, and DM-RS configuration, of the uplink data channel occasions of the third group and the uplink data channel occasions of the fourth group are different.

Figure 15:
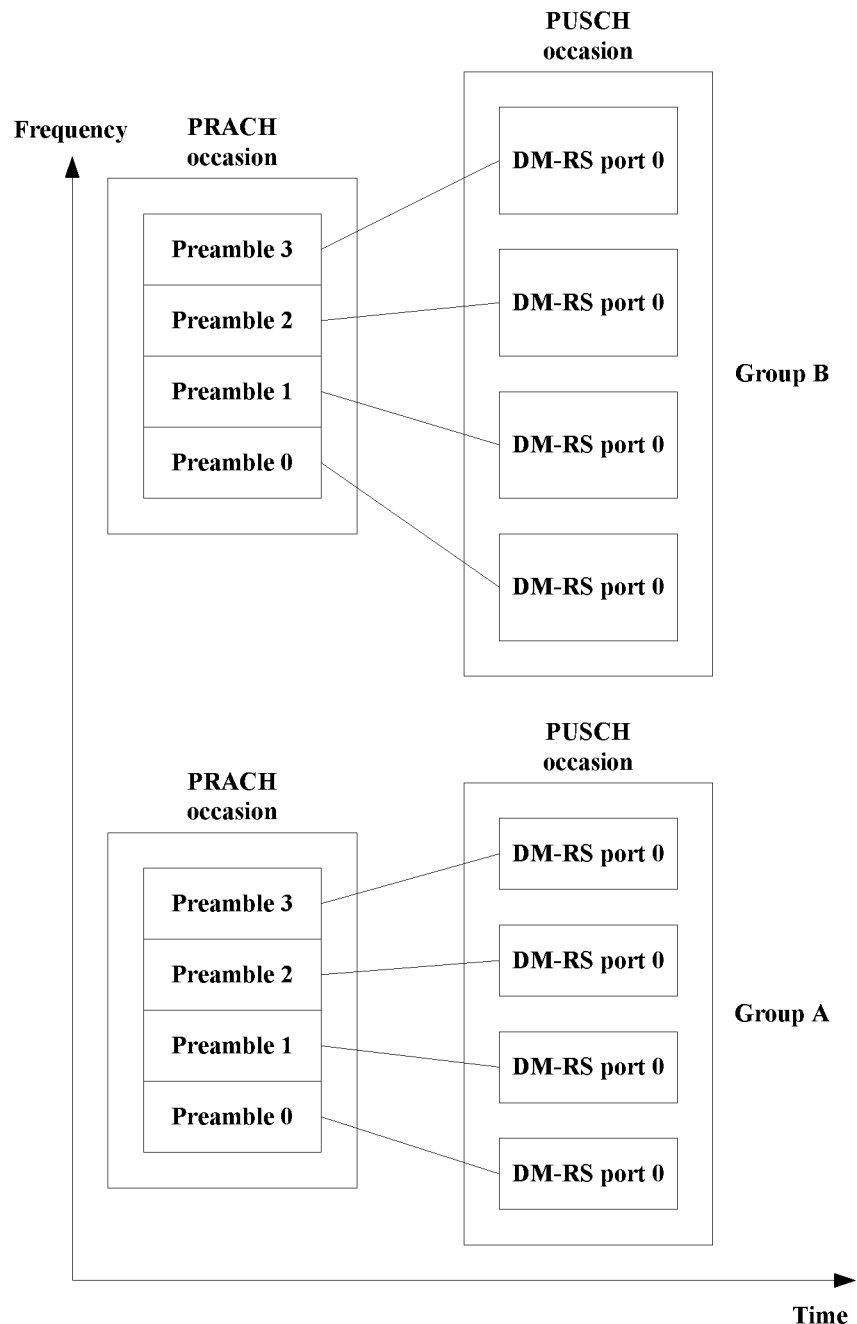
FIG. 15 is still another exemplary diagram of the resource mapping of the embodiment of this disclosure.

FIG. 15 is still another exemplary diagram of the resource mapping of the embodiment of this disclosure. As shown in FIG. 15, two PRACH occasions are respectively associated with two PUSCH occasions. In each pair of associated PRACH occasion and PUSCH occasion, the mapping between the preambles and (PUSCH resources, DM-RS ports) may be determined according to the above rules. FIG. 15 further shows an implementation, in which PUSCH resource group A and group B are respectively located in different PUSCH occasions. And the above method for selecting the DM-RSs and the rules for selecting group B are both applicable thereto.

Figure 16:
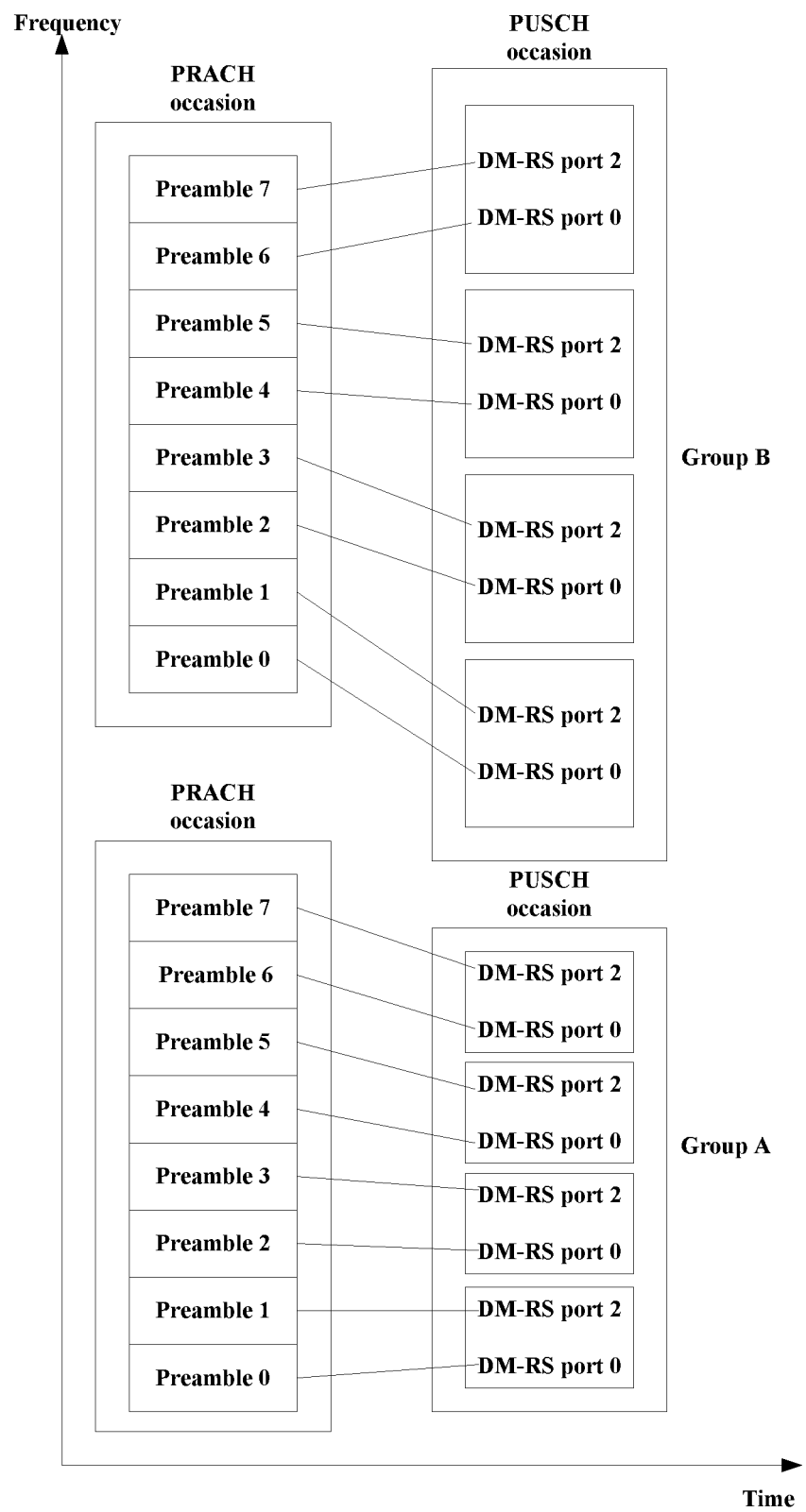
FIG. 16 is still another exemplary diagram of the resource mapping of the embodiment of this disclosure.

FIG. 16 is still another exemplary diagram of the resource mapping of the embodiment of this disclosure, with a main difference from FIG. 15 being that each PUSCH resource in FIG. 16 is configured with 2 DM-RS ports. Within each pair of associated PRACH occasion and PUSCH occasion, the mapping between the preambles and the (PUSCH resources, DM-RS ports) may be determined according to the above rules. And the above method for selecting the DM-RSs and the rules for selecting group B are both applicable.

In an embodiment, multiple random access channel occasions may be taken as a set of the preambles in the mapping, the multiple uplink data channel occasions may be taken as a set of the uplink data channel resources and the demodulation reference signal ports, and the preambles in the set of preambles are mapped to the set of the uplink data channel resources and demodulation reference signal ports.

For example, when multiple PRACH occasions and multiple PUSCH occasions are configured, the configured one or more PRACH occasions may be taken as a large preamble set, and the configured one or more PUSCH occasions may be taken as a large (PUSCH resources, DM-RS ports) set, and then mapping the preamble set to the (PUSCH resources, DM-RS ports) set is performed, any of the mapping methods described above being able to be used in the mapping.

As an implementation, the following mapping manner may be used: first, taking the configured one or more PRACH occasions as a large preamble set first, and taking the configured one or more PUSCH occasions as a large (PUSCH resources, DM-RS ports) set; second, for the above preamble set and the (PUSCH resources, DM-RS ports) set, mapping in an incremental order of the DM-RS ports first, and then mapping the frequency division multiplexed PUSCH resources in an incremental order of the frequencies. Likewise, the mapping in FIGS. 15 and 16 may be obtained.

When multiple PRACH occasions and multiple PUSCH occasions are configured, as an implementation, the following mapping order may be used: first, taking the configured one or more PRACH occasions as a large preamble set, and taking the configured one or more PUSCH occasions as a large (PUSCH resources, DM-RS ports) set; second, for the above preamble set and (PUSCH resources, DM-RS ports) set, mapping in r (r≥1) PUSCH resources in an incremental order of the DM-RS ports first, and then mapping in R (R≥r) PUSCH resources in an incremental order of the frequencies of the PUSCH resources. And the above method for selecting the DM-RSs and the rules for selecting group B are both applicable.

Whichever the above mapping methods is used, the description is given by taking that the mapping of the preambles to the (PUSCH resources, DM-RS ports) has a one-to-one relationship in time as an example, such as mapping preambles within a time interval to (PUSCH resources, DM-RS ports) within a time interval.

In an embodiment, in a case where the preambles within a time interval may be mapped to the tuple of the uplink data channel resources and the demodulation reference signal ports within multiple time intervals, the mapping is also performed on the tuple within the multiple time intervals in an incremental order of time.

For example, when preambles within a slot may be mapped to (PUSCH resources, DM-RS ports) within multiple slots, on the basis of any of the above mapping methods, time division multiplexed (PUSCH resources, DM-RS ports) may be mapped in incremental order of time. Here, the time interval may refer to a time range of last time of preamble transmission or one time of PUSCH transmission, which may be one or more slots.

Whichever the above mapping methods is used, when the PRACH occasions are configured, the (PUSCH resources, DM-RS ports) are configured and the PUSCH occasions are configured, it may occur that the time or symbol for transmitting the configured preambles, PUSCHs and DM-RS are unavailable.

In an embodiment, in a case where the preamble is available but the uplink data channel resource and the demodulation reference signal port are unavailable, the terminal equipment transmits the second random access request including the preamble but not including the uplink data and the demodulation reference signal; and in a case where the preamble is unavailable, the terminal equipment determines not to transmit the first random access request and the second random access request.

For example, a group of symbols at a slot are downlink or free (or flexible) symbols, or the terminal equipment needs to cancel preamble transmission or cancel PUSCH transmission on a group of symbols at a slot, and at this case, it is deemed that the slot or symbol is unavailable. Reference may be made to subsection 11.1 of TS 38.213 for detailed conditions that the terminal equipment cancels transmission of the preambles and/or PUSCHs, which shall not be described herein any further.

When the slot or symbol where the PUSCH is located is unavailable but the slot or symbol where the preamble is located associated therewith is available, the terminal equipment may still use the slot or symbol where the preamble is located to transmit the preamble. At this case, the terminal equipment regards it as conventional four-step random access, which is equivalent to that the terminal equipment is switched from the two-step random access to the four-step random access.

When the slot or symbol where the preamble is located is unavailable, even if the slot or symbol where the PUSCH associated therewith is available, the terminal equipment does not use the slot or symbol of the PUSCH for random access. When the slots or symbols where the preamble and PUSCH are located are unavailable, the terminal equipment does not use these slots for random access.

Performing mapping according to the established rules are schematically described above, that is, these mapping schemes are implicitly configured. The embodiments of this disclosure may also configure explicitly.

In an embodiment, when the network device configures the above uplink data channel resources, it also configures the demodulation reference signal ports with which the uplink data channel resources are associated, and configures the preambles and/or random access occasions with which the uplink data channel resources and the demodulation reference signal ports are associated.

For example, when the network device configures the PUSCH resources for the terminal equipment, it also configures the DM-RS ports with which the PUSCH resources are associated for the terminal equipment, and configures preamble indices and/or PRACH occasion indices with which the (PUSCH resources, DM-RS ports) are associated.

In an embodiment, at least two uplink data channel resources may be multiplexed in one resource block (RB).

For example, according to a size of msgB, a size of a PUSCH resource associated with a preamble may be smaller than an RB. When the size of the PUSCH resource is less than 1 RB, different PUSCH resources may be multiplexed in one RB, and nonoverlapped REs are used. In addition, in order to make different PUSCH resources have identical or similar sizes, an alternate mapping method may be used to determine the PUSCH resources.

In an embodiment, the at least two uplink data channel resources are associated with different demodulation reference signal ports (such as DM-RS port 0 and DM-RS port 2; however, this disclosure is not limited thereto), and the at least two uplink data channel resources are alternately mapped to resource elements (REs) in an order of frequency domain first and then time domain.

Figure 17:
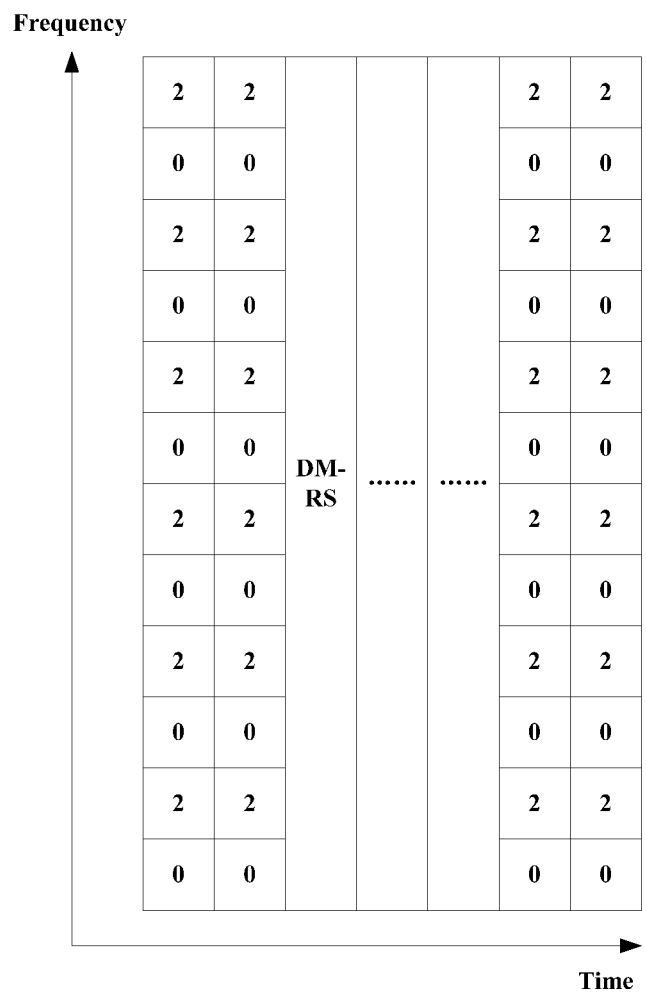
FIG. 17 is still another exemplary diagram of the resource mapping of the embodiment of this disclosure.

FIG. 17 is a schematic diagram of time-frequency resources of the embodiment of this disclosure. As shown in FIG. 17, two PUSCH resources are multiplexed with 1 RB, and two PUSCH resources are respectively associated with DM-RS port 0 and port 2. In order to make the two PUSCH resources have identical sizes, the alternate mapping method may be used to determine the PUSCH resources. In FIG. 17, an RE occupied by the PUSCH resources associated with DM-RS port 0 is marked as "0", and an RE occupied by the PUSCH resources associated with DM-RS port 2 is marked as "2", and the symbol where the DM-RSs are located is avoided during mapping.

With the alternate mapping, the PUSCH resources multiplexed in one RB have identical or similar sizes, and the PUSCH resources are dispersed throughout the RB. As the RE where the DM-RSs are located is also dispersed in the RB, the PUSCH resources may benefit from DM-RS-based channel estimation.

In an embodiment, when the uplink data channel resource overlaps the preamble in the frequency domain, the preamble may be used to perform channel estimation on the uplink data.

For example, when the PUSCH resource overlaps the resource (i.e. the PRACH occasion) where the preamble is located in the frequency domain, the preamble may be used to assist in PUSCH channel estimation. For example, the preamble is taken as a reference signal for the channel estimation, thereby improving channel estimation performance and demodulation and decoding performance.

In an embodiment, a first size of the uplink data channel resource not overlapping the preamble may be configured to be larger than a second size of uplink data channel resource overlapping the preamble.

For example, when the PUSCH resource does not overlap the resource where the preamble is located, the channel estimation of the PUSCH is able to be assisted by the preamble. In order to obtain decoding performance similar to other overlapping PUSCH resource, the size of the non-overlapping PUSCH resource may be configured to be larger, so that a code rate is lowered, thereby increasing the demodulation and decoding performance, making it close to the decoding performance in the preamble-assisted channel estimation.

In an embodiment, the mapping may start from an uplink data channel resource with a lowest frequency overlapping the preamble, and is performed in a frequency-increasing direction.

For example, in order to use an assisting function of the preamble for channel estimation, in mapping the preamble to the PUSCH resource, the mapping may start from a lowest PUSCH resource in the frequency domain overlapping the preamble, and then other PUSCH resources are mapped in the frequency-increasing direction, and when a highest frequency is reached, cyclic mapping is performed, that is, mapping to the lowest PUSCH resource in the frequency domain not overlapping the preamble.

In an embodiment, the demodulation reference signal may also be used to estimate timing advance (TA) of the terminal equipment.

For example, a DM-RS sequence may also be used for TA estimation. When a preamble is mapped to multiple (PUSCH resources, DM-RS ports), if multiple terminal equipments select identical preambles but select different (PUSCH resources, DM-RS ports), the network device is unable to differentiate TA of different terminal equipments via the preambles. However, as different terminal equipments use different DM-RS ports, the network device may estimate the TA of different terminal equipments via the DM-RS sequence.

Figure 18:
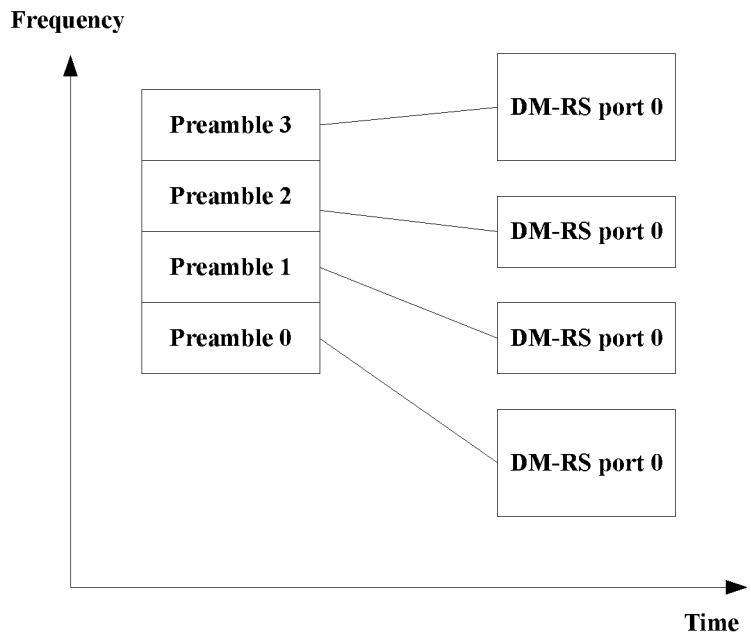
FIG. 18 is still another exemplary diagram of the resource mapping of the embodiment of this disclosure.

In the embodiments of this disclosure, there is no restriction on the positions of different PUSCH resources. FIG. 18 is still another exemplary diagram of the resource mapping of the embodiment of this disclosure. As shown in FIG. 18, PUSCH resources of different sizes may be alternately configured in the frequency domain.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the mapping of the preamble to the uplink data channel resource and the demodulation reference signal port is implicitly configured or is configured explicitly by the network device according to the configuration information. Thus, the mapping relationship between the preamble and the uplink data resource and the DM-RS port may be determined, and the network device may immediately obtain the PUSCH and DM-RS information associated with it based on the received preamble, which may not only improve a random access performance, but also provide sufficient configuration flexibility.

Embodiment 2

The embodiments of this disclosure provide a random access method, which shall be described from a network device side, with contents identical to those in Embodiment 1 being not going to be described herein any further.

Figure 19:
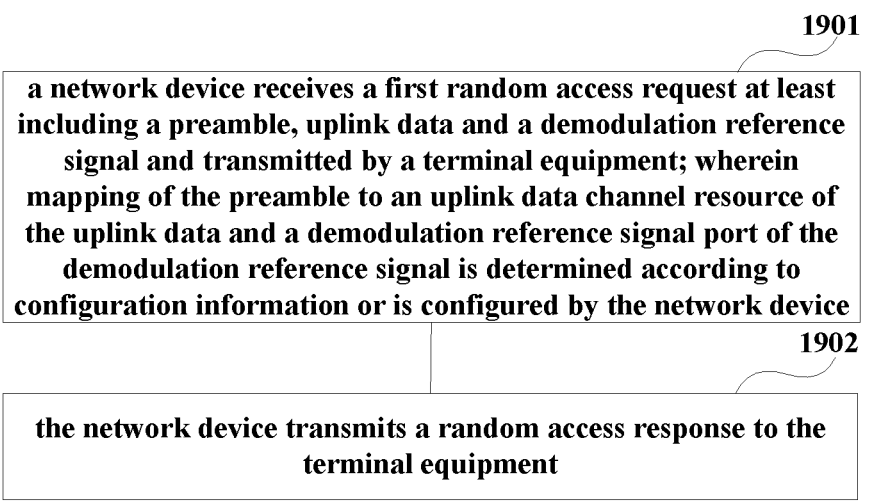
FIG. 19 is a schematic diagram of the random access method of an embodiment of this disclosure.

FIG. 19 is a schematic diagram of the random access method of the embodiment of this disclosure. As shown in FIG. 19, the method includes:

step 1901: a network device receives a first random access request at least including a preamble, uplink data and a demodulation reference signal and transmitted by a terminal equipment; wherein mapping of the preamble to an uplink data channel resource of the uplink data and a demodulation reference signal port of the demodulation reference signal is determined according to configuration information or is configured by the network device; and step 1902: the network device transmits a random access response to the terminal equipment.

In an embodiment, one of preambles is mapped to at least one tuple of uplink data channel resources and demodulation reference signal ports, and one of the uplink data channel resources is at least configured with one of the demodulation reference signal ports.

In an embodiment, the preambles are mapped in the following manner: mapping one or more of the demodulation reference signal ports of one of the uplink data channel resources in an incremental order of indices first, and then mapping one or more of the uplink data channel resources in an incremental order of frequencies.

In an embodiment, when the network device configures uplink data channel resources for the terminal equipment, it also configures demodulation reference signal ports associated with the uplink data channel resources, and configures preambles and/or random access occasions associated with the uplink data channel resources and the demodulation reference signal ports.

It should be noted that FIG. 19 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 19.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the mapping of the preamble to the uplink data channel resource and the demodulation reference signal port is implicitly configured or is configured explicitly by the network device according to the configuration information. Thus, the mapping relationship between the preamble and the uplink data resource and the DM-RS port may be determined, and the network device may immediately obtain the PUSCH and DM-RS information associated with it based on the received preamble, which may not only improve a random access performance, but also provide sufficient configuration flexibility.

Embodiment 3

The embodiments of this disclosure provide a random access apparatus. The apparatus may be, for example, a terminal equipment, or may be one or more components or assemblies configured in a terminal equipment. Contents in the embodiments identical to those in Embodiment 1 shall not be described herein any further.

Figure 20:
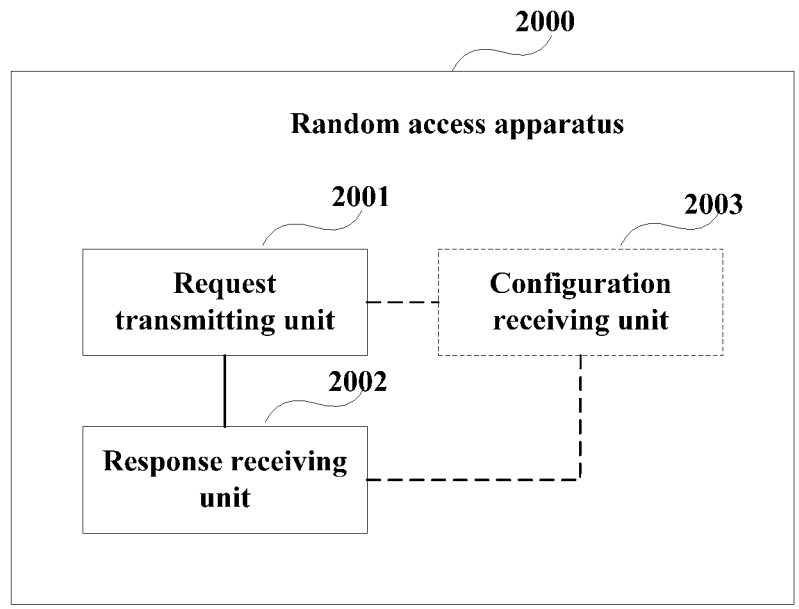
FIG. 20 is a schematic diagram of the random access apparatus of an embodiment of this disclosure.

FIG. 20 is a schematic diagram of the random access apparatus of an embodiment of this disclosure. As shown in FIG. 20, a random access apparatus 2000 includes:

a request transmitting unit 2001 configured to transmit a first random access request at least including a preamble, uplink data and a demodulation reference signal to a network device; wherein mapping of the preamble to an uplink data channel resource of the uplink data and a demodulation reference signal port of the demodulation reference signal is determined according to configuration information from the network device or is configured by the network device; and a response receiving unit 2002 configured to receive a random access response transmitted by the network device.

As shown in FIG. 20, the random access apparatus 2000 may further include:

a configuration receiving unit 2003 configured to receive configuration information of preambles, uplink data channel resources and demodulation reference signal ports, and the request transmitting unit 2001 may implicitly determine the mapping according to the configuration information.

In an embodiment, the configuration receiving unit 2003 may also receive configuration of the mapping of the preamble to the uplink data channel resource and the demodulation reference signal port transmitted by the network device, and the request transmitting unit 2001 may explicitly determine the mapping according to the configuration of mapping.

In an embodiment, one of preambles is mapped to at least one tuple of uplink data channel resources and demodulation reference signal ports, and one of the uplink data channel resources is at least configured with one of the demodulation reference signal ports.

In an embodiment, the preambles are mapped in the following manner: mapping one or more of the demodulation reference signal ports of one of uplink data channel resources in an incremental order of indices first, and then mapping one or more of the uplink data channel resources in an incremental order of frequencies.

In an embodiment, one of the preambles is mapped to r ($r \geq 1$) of the uplink data channel resources, and the preamble is mapped to p ($p \geq 1$) demodulation reference signal ports in each of the uplink data channel resources;

and one of the preambles is mapped in a manner as follows: mapping the preamble within the r uplink data channel resources in an incremental order of indices of the demodulation reference signal ports first, then mapping the preamble within R ($R \geq r$) uplink data channel resources in an incremental order of frequencies of the uplink data channel resources.

In an embodiment, when a tuple of the uplink data channel resources and the demodulation reference signal ports is not mapped to the preamble, the tuple is determined not to be used for the first random access request, and/or when the one of preambles is not mapped to the tuple of the uplink data channel resources and the demodulation reference signal ports, a second random access request including the preamble but not including the uplink data and the demodulation reference signals is transmitted.

In an embodiment, one of the uplink data channel resources is configured with a frequency division multiplexed first demodulation reference signal port and second demodulation reference signal port; where the first demodulation reference signal port and the second demodulation reference signal port occupy completely all subcarriers in the frequency domain in a resource block.

In an embodiment, one of the uplink data channel resources is configured with a code division multiplexed third demodulation reference signal port and fourth demodulation reference signal port;

in an embodiment, when the uplink data use an orthogonal frequency division multiplexing waveform, the frequency division multiplexed first demodulation reference signal port and second demodulation reference signal port are used;

in a where the uplink data use a discrete Fourier transform spread orthogonal frequency division multiplexing waveform, the code division multiplexed third demodulation reference signal port and fourth demodulation reference signal port are used.

In an embodiment, a plurality of the uplink data channel resources are at least configured as a first group and a second group, and one of the uplink data channel resources is at least configured with one demodulation reference signal port;
  wherein parameters of at least one of a size, a modulation scheme, a code rate, a waveform, and DM-RS configuration, of the uplink data channel resources of the first group and the uplink data channel resources of the second group are different.

In an embodiment, the uplink data channel resources of the second group with a larger size are selected under at least one of the following conditions:
  the random access request is addressed to a common control channel, and a size of a service data unit of the common control channel plus a size of a media access control subheader is greater than a first threshold;
  a size of the random access request is greater than a second threshold, and/or a pathloss and/or reference signal received power of the random access request is/are less than a third threshold;
  the terminal equipment is in a radio resource control connected state and has user plane data to be transmitted;
  a transmission block error rate of the uplink data channel is greater than a fourth threshold;
  reference signal received power is less than a fifth threshold; and
  a signal noise rate or a signal to interference plus noise rate is less than a sixth threshold.

In an embodiment, the preambles mapped to the uplink data channel resources of the first group are identical to the preambles mapped to the uplink data channel resources of the second group, or the preambles mapped to the uplink data channel resources of the first group are different from the preambles mapped to the uplink data channel resources of the second group.

In an embodiment, the uplink data channel resources of the first group overlap with the uplink data channel resources of the second group, and the overlapped uplink data channel resources are configured with different demodulation reference signal ports.

In an embodiment, the preambles are mapped in a group first, and then multiple groups are mapped in an incremental order of indices of the groups.

In an embodiment, one or more of preambles are configured in at least one random access channel occasion, and one or more of uplink data channel resources and demodulation reference signal ports are configured in at least one uplink data channel occasion;
  preambles in the one random access channel occasion are mapped to the one uplink data channel occasion, and the preambles are first mapped in the one uplink data channel occasion, and then the preambles are mapped in an incremental order of frequencies for one or more uplink data channel occasions;

In an embodiment, in configuring the uplink data channel resources within the uplink data channel occasion, relative positions of the uplink data channel resources within the uplink data channel occasion are indicated.

In an embodiment, multiple uplink data channel occasions are at least configured as a third group and a fourth group; wherein parameters of at least one of a size, a modulation scheme, a code rate, a waveform, and demodulation reference signal configuration, of the uplink data channel occasions of the third group and the uplink data channel occasions of the fourth group are different.

In an embodiment, multiple random access channel occasions are taken as a set of the preambles in the mapping, and the multiple uplink data channel occasions are taken as a set of the uplink data channel resources and the demodulation reference signal ports.

In an embodiment, in a case where preambles within a time interval are able to be mapped to tuples of the uplink data channel resources and the demodulation reference signal ports within multiple time intervals, the mapping is also performed on the tuples within the multiple time intervals in an incremental order of time.

In an embodiment, the transmitting unit 2001 is further configured to: in a case where the preamble is available but the uplink data channel resource and the demodulation reference signal port are not available, transmit a second random access request including the preamble but not including the uplink data and the demodulation reference signal, and in a case where the preamble is not available, determine not to transmit the first random access request and the second random access request.

In an embodiment, when the uplink data channel resources are configured by the network device, demodulation reference signal ports associated with the uplink data channel resources are configured, and preambles and/or random access occasions associated with the uplink data channel resources and the demodulation reference signal ports are also configured.

In an embodiment, at least two uplink data channel resources are multiplexed in one resource block;
  wherein the at least two uplink data channel resources are associated with different demodulation reference signal ports, and the at least two uplink data channel resources are alternately mapped to resource elements in an order of frequency domain first and then time domain.

In an embodiment, when the uplink data channel resources are overlapped with the preambles in the frequency domain, channel estimation is performed on the uplink data by using the preambles.

In an embodiment, a first size of uplink data channel resources not overlapped with the preambles is configured to be larger than a second size of uplink data channel resources overlapped with the preamble.

In an embodiment, the demodulation reference signal is further used for estimating timing advance of the terminal equipment.

In an embodiment, the mapping is performed in a frequency increasing direction starting from an uplink data channel resource overlapped with the preamble and having a lowest frequency.

It should be noted that the components or modules related to this disclosure are only described above. However, this disclosure is not limited thereto, and the random access apparatus 2000 may further include other components or modules, and reference may be made to related techniques for particulars of these components or modules.

Furthermore, for the sake of simplicity, connection relationships between the components or modules or signal profiles thereof are only illustrated in FIG. 20. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the mapping of the preamble to the uplink data channel resource and the demodulation reference signal port is implicitly configured or is configured explicitly by the network device according to the configuration information. Thus, the mapping relationship between the preamble and the uplink data resource and the DM-RS port may be determined, and the network device may immediately obtain the PUSCH and DM-RS information associated with it based on the received preambles, which may not only improve a random access performance, but also provide sufficient configuration flexibility.

Embodiment 4

The embodiments of this disclosure provide a random access apparatus. The apparatus may be, for example, a network device, or may be one or more components or assemblies configured in a network device. Contents in the embodiments identical to those in embodiments 1 and 2 shall not be described herein any further.

Figure 21:
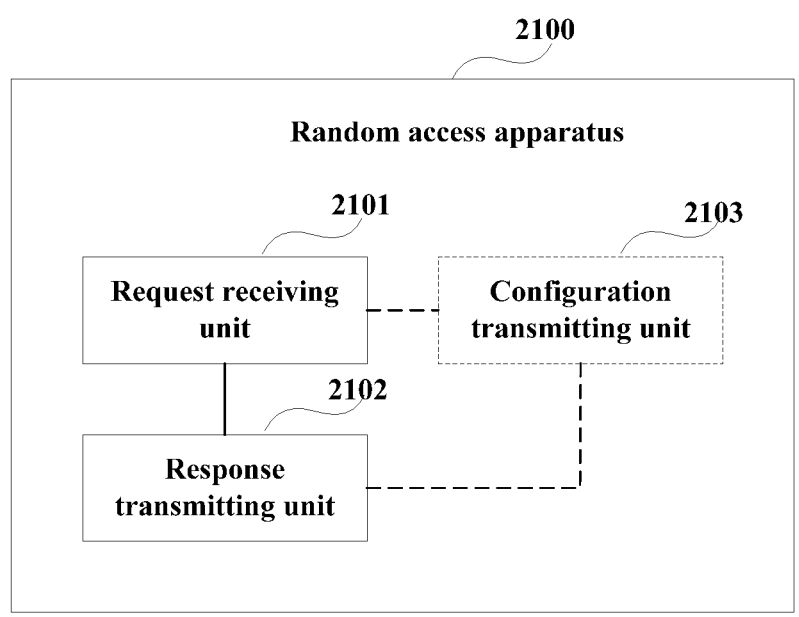
FIG. 21 is another schematic diagram of the random access apparatus of the embodiment of this disclosure.

FIG. 21 is a schematic diagram of the random access apparatus of the embodiment of this disclosure. As shown in FIG. 21, a random access apparatus 2100 includes:
  a request receiving unit 2101 configured to receive a first random access request at least including a preamble, uplink data and a demodulation reference signal and transmitted by a terminal equipment; wherein mapping of the preamble to an uplink data channel resource of the uplink data and a demodulation reference signal port of the demodulation reference signal is determined according to configuration information or is configured by the network device; and
  a response transmitting unit 2102 configured to transmit a random access response to the terminal equipment.

As shown in FIG. 21, the random access apparatus 2100 may further include:
  a configuration transmitting unit 2103 configured to transmit configuration information of preambles, uplink data channel resources and demodulation reference signal ports to the terminal equipment.

In an embodiment, the configuration transmitting unit 2103 may further configure the terminal equipment with mapping from the preamble to the uplink data channel resource and the demodulation reference signal port.

In an embodiment, one of preambles is mapped to at least one tuple of uplink data channel resources and demodulation reference signal ports, and one of the uplink data channel resources is at least configured with one of the demodulation reference signal ports.

In an embodiment, the preambles are mapped in the following manner: mapping one or more of the demodulation reference signal ports of one of uplink data channel resources in an incremental order of indices first, and then mapping one or more of the uplink data channel resources in an incremental order of frequencies.

In an embodiment, when the network device configures the above uplink data channel resources for the terminal equipment, it also configures the demodulation reference signal ports with which the uplink data channel resources are associated, and configures the preambles and/or random access occasions with which the uplink data channel resources and the demodulation reference signal ports are associated.

It should be noted that the components or modules related to this disclosure are only described above. However, this disclosure is not limited thereto, and the random access apparatus 2100 may further include other components or modules, and reference may be made to related techniques for particulars of these components or modules.

Furthermore, for the sake of simplicity, connection relationships between the components or modules or signal profiles thereof are only illustrated in FIG. 21. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the mapping of the preamble to the uplink data channel resource and the demodulation reference signal port is implicitly configured or is configured explicitly by the network device according to the configuration information. Thus, the mapping relationship between the preamble and the uplink data resource and the DM-RS port may be determined, and the network device may immediately obtain the PUSCH and DM-RS information associated with it based on the received preambles, which may not only improve a random access performance, but also provide sufficient configuration flexibility.

Embodiment 5

The embodiments of this disclosure provide a communication system, and reference may be made to FIG. 3, with contents identical to those in embodiments 1~4 being not going to be described herein any further. In an embodiment, the communication system 100 may include:
  a terminal equipment 102 configured to transmit a first random access request at least including a preamble, uplink data and a demodulation reference signal to a network device 101, and receive a random access response transmitted by the network device 101;
  the network device 101 configured to receive the first random access request and transmit the random access response to the terminal equipment 102; wherein mapping of the preamble to an uplink data channel resource of the uplink data and a demodulation reference signal port of the demodulation reference signal is determined according to configuration information from the network device or is configured by the network device 101.

The embodiment of this disclosure further provides a network device, which may be, for example, a base station. However, this disclosure is not limited thereto, and it may also be another network device.

Figure 22:
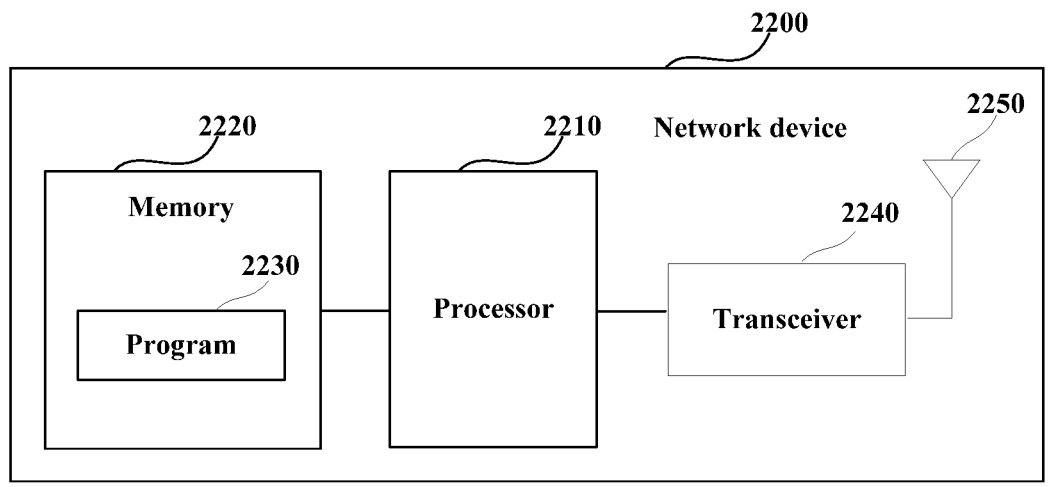
FIG. 22 is a schematic diagram of the network device of an embodiment of this disclosure.

FIG. 22 is a schematic diagram of a structure the network device of the embodiment of this disclosure. As shown in FIG. 22, a network device 2200 may include a processor 2210 (such as a central processing unit (CPU)) and a memory 2220, the memory 2220 being coupled to the processor 2210. The memory 2220 may store various data, and furthermore, it may store a program 2230 for data processing, and execute the program 2230 under control of the processor 2210.

For example, the processor 2210 may be configured to execute the program to carry out the random access method described in Embodiment 2. For example, the processor 2210 may be configured to perform the following control: receiving a first random access request at least including a preamble, uplink data and a demodulation reference signal and transmitted by a terminal equipment, and transmitting a random access response to the terminal equipment; wherein mapping of the preamble to an uplink data channel resource of the uplink data and a demodulation reference signal port of the demodulation reference signal is determined according to configuration information or is configured by the network device 101.

Furthermore, as shown in FIG. 22, the network device 2200 may include a transceiver 2240, and an antenna 2250, etc. Functions of the above components are similar to those in the relevant art, and shall not be described herein any further. It should be noted that the network device 2200 does not necessarily include all the parts shown in FIG. 22, and furthermore, the network device 2200 may include parts not shown in FIG. 22, and the relevant art may be referred to.

The embodiment of this disclosure further provides a terminal equipment; however, this disclosure is not limited thereto, and it may also be another equipment.

Figure 23:
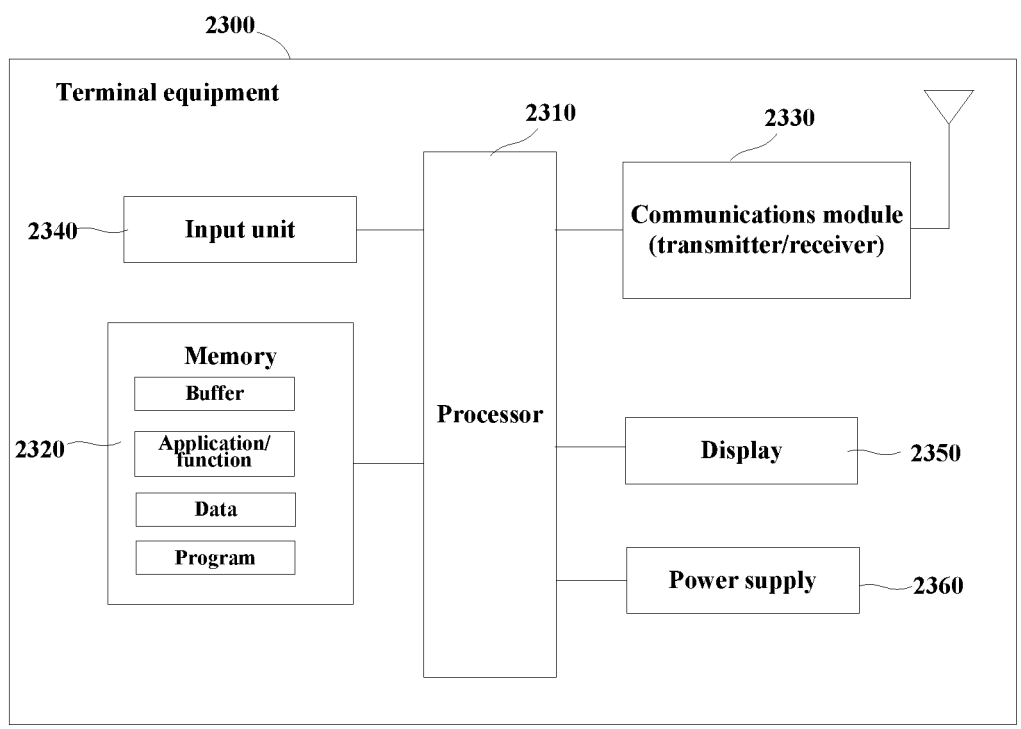
FIG. 23 is a schematic diagram of the terminal equipment of an embodiment of this disclosure.

FIG. 23 is a schematic diagram of the terminal equipment of the embodiment of this disclosure. As shown in FIG. 23, a terminal equipment 2300 may include a processor 2310 and a memory 2320, the memory 2320 storing data and a program and being coupled to the processor 2310. It should be noted that this figure is illustrative only, and other types of structures may also be used, so as to supplement or replace this structure and achieve a telecommunications function or other functions.

For example, the processor 2310 may be configured to execute a program to carry out the random access method as described in Embodiment 1. For example, the processor 2310 may be configured to perform the following control: transmitting a first random access request at least including a preamble, uplink data and a demodulation reference signal to a network device; wherein mapping of the preamble to an uplink data channel resource of the uplink data and a demodulation reference signal port of the demodulation reference signal is determined according to configuration information from the network device or is configured by the network device 101; and receiving a random access response transmitted by the network device.

As shown in FIG. 23, the terminal equipment 2300 may further include a communication module 2330, an input unit 2340, a display 2350, and a power supply 2360; wherein functions of the above components are similar to those in the relevant art, which shall not be described herein any further. It should be noted that the terminal equipment 2300 does not necessarily include all the parts shown in FIG. 23, and the above components are not necessary. Furthermore, the terminal equipment 2300 may include parts not shown in FIG. 23, and the relevant art may be referred to.

An embodiment of the present disclosure provides a computer readable program, which, when executed in a terminal equipment, will cause the terminal equipment to carry out the random access method as described in Embodiment 1.

An embodiment of this disclosure provides a computer storage medium, including a computer readable program, which will cause a terminal equipment to carry out the random access method as described in Embodiment 1.

An embodiment of the present disclosure provides a computer readable program, which, when executed in a network device, will cause the network device to carry out the random access method as described in Embodiment 2.

An embodiment of this disclosure provides a computer storage medium, including a computer readable program, which will cause a network device to carry out the random access method as described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A random access method, including:
transmitting a first random access request at least including a preamble, uplink data and a demodulation reference signal by a terminal equipment to a network device; wherein mapping of the preamble to an uplink data channel resource of the uplink data and a demodulation reference signal port of the demodulation reference signal is determined according to configuration information from the network device or is configured by the network device; and receiving a random access response transmitted by the network device.

Supplement 2. The method according to supplement 1, wherein one of preambles is mapped to a tuple of at least one of uplink data channel resources and demodulation reference signal ports, and one of the uplink data channel resources is at least configured with one of the demodulation reference signal ports.

Supplement 3. The method according to supplement 1 or 2, wherein preambles are mapped in a manner as follows: mapping one or more of demodulation reference signal ports of one of uplink data channel resources in an incremental order of indices first, and then mapping one or more of the uplink data channel resources in an incremental order of frequencies.

Supplement 4. The method according to supplement 1 or 2, wherein one of preambles is mapped to r (r≥1) of the uplink data channel resources, and the preamble is mapped top (p≥1) of the demodulation reference signal ports within each of uplink data channel resources;

and the preamble is mapped in a manner as follows: mapping the preambles within the r uplink data channel resources in an incremental order of indices of the demodulation reference signal ports first; then mapping the preamble within the R≥r) uplink data channel resources in an incremental order of frequencies of the uplink data channel resources.

Supplement 5. The method according to supplement 4, wherein when a tuple of the uplink data channel resources and the demodulation reference signal ports is not mapped to the preamble, the tuple is determined not to be used for the first random access request; and/or when the one of preambles is not mapped to the tuple of the uplink data channel resources and the demodulation reference signal ports, a second random access request including the preamble but not including the uplink data and the demodulation reference signals is transmitted.

Supplement 6. The method according to any one of supplements 1-5, wherein one of uplink data channel resources is configured with a first demodulation reference signal port and a second demodulation reference signal port (such as DM-RS port 1 and DM-RS port 2) which are frequency division multiplexed.

Supplement 7. The method according to supplement 6, wherein the first demodulation reference signal port and the second demodulation reference signal port (such as DM-RS port 1 and DM-RS port 2) occupy all (12) subcarriers in the frequency domain in a resource block (a demodulation reference signal configuration type 1 is used).

Supplement 8. The method according to any one of supplements 1-5, wherein one of uplink data channel resources is configured with a third demodulation reference signal port and a fourth demodulation reference signal port which are code division multiplexed (such as DM-RS port 0 and DM-RS port 1).

Supplement 9. The method according to any one of supplements 1-8, wherein when the uplink data use an orthogonal frequency division multiplexing (OFDM) waveform, a first demodulation reference signal port and a second demodulation reference signal port which are frequency division multiplexed are used;

and when the uplink data use a DFT-S-OFDM waveform, a third demodulation reference signal port and a fourth demodulation reference signal port which are code division multiplexed are used (such as DM-RS port 0 and DM-RS port 1).

Supplement 10. The method according to any one of supplements 1-9, wherein a plurality of uplink data channel resources are at least configured into a first group and a second group, and one of uplink data channel resources is at least configured with one of the demodulation reference signal ports.

Supplement 11. The method according to supplement 10, wherein parameters of at least one of a size, a modulation scheme, a code rate, a waveform, and DM-RS configuration, of the uplink data channel resources of the first group and the uplink data channel resources of the second group are different.

Supplement 12. The method according to supplement 11, wherein the uplink data channel resources of the second group have a larger size or a lower modulation scheme than the uplink data channel resources of the first group, and the uplink data channel resources of the second group are selected under at least one of the following conditions that:

the random access request is directed to a common control channel, and a size of a service data unit (SDU) of the common control channel plus a size of a media access control sub-header is greater than a first threshold;

a size of the random access request is greater than a second threshold, and/or a pathloss and/or reference signal received power of the random access request is less than a third threshold;

the terminal equipment is in a radio resource control (RRC) connected state and has user plane data to be transmitted;

a block error rate (BLER) of transmission of an uplink data channel is greater than a fourth threshold;

reference signal received power (RSRP) is less than a fifth threshold; and a signal to noise ratio (SNR) or a signal to interference plus noise ratio (SINK) is less than a sixth threshold.

Supplement 13. The method according to any one of supplements 10-12, wherein preambles mapped to the uplink data channel resources of the first group are different from the preambles mapped to the uplink data channel resources of the second group.

Supplement 14. The method according to any one of supplements 10-12, wherein preambles mapped to the uplink data channel resources of the first group are identical to the preambles mapped to the uplink data channel resources of the second group.

Supplement 15. The method according to any one of supplements 10-14, wherein the uplink data channel resources of the first group overlap with the uplink data channel resources of the second group, and the overlapped uplink data channel resources are configured with different demodulation reference signal ports.

Supplement 16. The method according to any one of supplements 10-15, wherein the preambles are mapped in a group first, and then multiple groups are mapped in an incremental order of indices of the groups.

Supplement 17. The method according to any one of supplements 1-16, wherein one or more of the preambles are configured in at least one random access channel occasion, and one or more of uplink data channel resources and demodulation reference signal ports are configured in at least one uplink data channel occasion.

Supplement 18. The method according to supplement 17, wherein preambles in the one random access channel occasion are mapped to the one uplink data channel occasion, and the preambles are first mapped in the one uplink data channel occasion, and then the preambles are mapped in an incremental order of frequencies for one or more uplink data channel occasions.

Supplement 19. The method according to supplement 17 or 18, wherein in configuring the uplink data channel resources within the uplink data channel occasion, a relative position of an uplink data channel resource within the uplink data channel occasion is indicated.

Supplement 20. The method according to any one of supplements 17-19, wherein multiple uplink data channel occasions are at least configured as a third group and a fourth group.

Supplement 21. The method according to supplement 20, wherein parameters of at least one of a size, a modulation scheme, a code rate, a waveform, and demodulation reference signal configuration, of the uplink data channel occasions of the third group and the uplink data channel occasions of the fourth group are different.

Supplement 22. The method according to any one of supplements 17-21, wherein the mapping takes multiple random access channel occasions as a set of the preambles, takes multiple uplink data channel occasions as a set of the uplink data channel resources and the demodulation reference signal ports, and maps a preamble in the set of the preambles to the set of the uplink data channel resources and the demodulation reference signal ports.

Supplement 23. The method according to any one of supplements 1-22, wherein in a case where preambles within a time interval are able to be mapped to tuples of the uplink data channel resources and the demodulation reference signal ports within multiple time intervals, the mapping is also performed on the tuples within the multiple time intervals in an incremental order of time.

Supplement 24. The method according to any one of supplements 1-23, wherein the method further includes:
in a case where the preamble is available but the uplink data channel resource and the demodulation reference signal port are not available, transmitting a second random access request including the preamble but not including the uplink data and the demodulation reference signal by the terminal equipment;
and in a case where the preamble is not available, determining by the terminal equipment not to transmit the first random access request and the second random access request.

Supplement 25. The method according to supplement 1 or 2, wherein the method further includes:
when the uplink data channel resources are configured by the network device, configuring demodulation reference signal ports associated with the uplink data channel resources, and configuring preambles and/or random access occasions associated with the uplink data channel resources and the demodulation reference signal ports.

Supplement 26. The method according to any one of supplements 1-25, wherein at least two of the uplink data channel resources are multiplexed in one resource block (RB).

Supplement 27. The method according to supplement 26, wherein the at least two uplink data channel resources are associated with different demodulation reference signal ports, and the at least two uplink data channel resources are alternately mapped to resource elements (REs) in an order of frequency domain first and then time domain.

Supplement 28. The method according to any one of supplements 1-27, wherein when the uplink data channel resources are overlapped with the preambles in the frequency domain, channel estimation is performed on the uplink data by using the preambles.

Supplement 29. The method according to any one of supplements 1-27, wherein a first size of an uplink data channel resource not overlapped with the preamble is configured to be larger than a second size of an uplink data channel resource overlapped with the preamble.

Supplement 30. The method according to any one of supplements 1-29, wherein the mapping is performed in a frequency increasing direction starting from an uplink data channel resource overlapped with the preamble and having a lowest frequency.

Supplement 31. The method according to any one of supplements 1-30, wherein the demodulation reference signal is further used for estimating timing advance (TA) of the terminal equipment.

Supplement 32. A random access method, including:
receiving by a network device a first random access request at least including a preamble, uplink data and a demodulation reference signal and transmitted by a terminal equipment; wherein mapping of the preamble to an uplink data channel resource of the uplink data and a demodulation reference signal port of the demodulation reference signal is determined according to configuration information or is configured by the network device; and
transmitting a random access response by the network device to the terminal equipment.

Supplement 33. The method according to supplement 32, wherein one of preambles is mapped to at least one tuple of uplink data channel resources and demodulation reference signal ports, and one of the uplink data channel resources is at least configured with one of the demodulation reference signal ports.

Supplement 34. The method according to supplement 32 or 33, wherein preambles are mapped in the following manner: mapping one or more of demodulation reference signal ports of one of uplink data channel resources in an incremental order of indices first, and then mapping one or more of the uplink data channel resources in an incremental order of frequencies.

Supplement 35. The method according to supplement 32 or 33, wherein when the network device configures uplink data channel resources for the terminal equipment, it also configures demodulation reference signal ports associated with the uplink data channel resources, and configures preambles and/or random access occasions associated with the uplink data channel resources and the demodulation reference signal ports.

Supplement 36. A terminal equipment, including a memory and a processor, the memory storing a computer program, and the processor being configured to execute the computer program to carry out the random access method as described in any one of supplements 1-31.

Supplement 37. A network device, including a memory and a processor, the memory storing a computer program, and the processor being configured to execute the computer program to carry out the random access method as described in any one of supplements 32-35.

What is claimed is:
1. A random access apparatus, comprising:
a transmitter configured to transmit a first random access request at least comprising a preamble, uplink data and a demodulation reference signal to a network device, wherein mapping of the preamble to an uplink data channel resource of the uplink data and a demodulation reference signal port of the demodulation reference signal is determined according to configuration information from the network device or is configured by the network device; and
a receiver configured to receive a random access response transmitted by the network device;
wherein a plurality of uplink data channel resources are at least configured into a first group and a second group, and one of uplink data channel resources is at least configured with one of the demodulation reference signal ports, and
when one of preambles is not mapped to the tuple of the uplink data channel resources and the demodulation reference signal ports, a second random access request comprising the preamble but not comprising the uplink data and the demodulation reference signal is transmitted.

2. The apparatus according to claim 1, wherein the uplink data channel resources of the second group are selected under at least one of the following conditions that:
a random access request is directed to a common control channel, and a size of a service data unit of the common control channel plus a size of a media access control sub-header is greater than a first threshold;
a size of the random access request is greater than a second threshold;
a pathloss of the random access request is less than a third threshold;
reference signal received power of the random access request is less than a third threshold;
a terminal equipment is in a radio resource control connected state and has user plane data to be transmitted;
a block error rate of transmission of an uplink data channel is greater than a fourth threshold;
reference signal received power is less than a fifth threshold; and
a signal to noise ratio or a signal to interference plus noise ratio is less than a sixth threshold.

3. The apparatus according to claim 1, wherein mapping of the preamble to an uplink data channel resource of the uplink data and a demodulation reference signal port of the demodulation reference signal is determined per group.

4. The apparatus according to claim 1, wherein
when a tuple of uplink data channel resources and demodulation reference signal ports is not mapped to the preamble, the tuple is determined not to be used for the first random access request.

5. The apparatus according to claim 1, wherein
in a case where the preamble is available but the uplink data channel resource and the demodulation reference signal port are not available, a second random access request comprising the preamble but not comprising the uplink data and the demodulation reference signal is transmitted.

6. The apparatus according to claim 1, wherein uplink data channel resources are consecutive in a frequency domain.

7. The apparatus according to claim 1, wherein preambles mapped to uplink data channel resources of the first group are identical to or different from preambles mapped to uplink data channel resources of the second group.

8. The apparatus according to claim 1, wherein parameters of at least one of a size, a modulation scheme, a code rate, a waveform, and demodulation reference signal configuration, of uplink data channel resources of the first group and uplink data channel resources of the second group are different.

9. The apparatus according to claim 1, wherein uplink data channel resources of the second group have a larger size or a lower modulation scheme than uplink data channel resources of the first group.

10. The apparatus according to claim 1, wherein one of preambles is mapped to a tuple of at least one of uplink data channel resources and demodulation reference signal ports, and one of the uplink data channel resources is at least configured with one of the demodulation reference signal ports.

11. The apparatus according to claim 1, wherein preambles are mapped in a manner as follows: mapping one or more of demodulation reference signal ports of one of uplink data channel resources in an incremental order of indices first, and then mapping one or more of the uplink data channel resources in an incremental order of frequencies.

12. The apparatus according to claim 1, wherein one of preambles is mapped to r of uplink data channel resources, and the preamble is mapped to p demodulation reference signal ports within each of uplink data channel resources;
wherein the preamble is mapped in a manner as follows: mapping the preamble within the r uplink data channel resources in an incremental order of indices of the demodulation reference signal ports first; then mapping the preamble within the R uplink data channel resources in an incremental order of frequencies of the uplink data channel resources; where, r≥1, p≥1, and R≥r.

13. The apparatus according to claim 1, wherein one of uplink data channel resources is configured with a first demodulation reference signal port and a second demodulation reference signal port which are frequency division multiplexed; and wherein the first demodulation reference signal port and the second demodulation reference signal port occupy all subcarriers in the frequency domain in a resource block;
or, one of uplink data channel resources is configured with a third demodulation reference signal port and a fourth demodulation reference signal port which are code division multiplexed.

14. The apparatus according to claim 1, wherein one or more of preambles are configured in at least one random access channel occasion, and one or more of uplink data channel resources and demodulation reference signal ports are configured in at least one uplink data channel occasion.

15. The apparatus according to claim 14, wherein preambles in one random access channel occasion are mapped to one uplink data channel occasion, and the preambles are first mapped in the one uplink data channel occasion, and then the preambles are mapped in an incremental order of frequencies for one or more uplink data channel occasions.

16. The apparatus according to claim 14, wherein multiple uplink data channel occasions are at least configured as a third group and a fourth group;
and wherein parameters of at least one of a size, a modulation scheme, a code rate, a waveform, and demodulation reference signal configuration, of the uplink data channel occasions of the third group and the uplink data channel occasions of the fourth group are different.

17. The apparatus according to claim 14, wherein in configuring the uplink data channel resources within the uplink data channel occasion, a relative position of an uplink data channel resource within the uplink data channel occasion is indicated.

18. The apparatus according to claim 14, wherein multiple random access channel occasions are taken as a set of the preambles, multiple uplink data channel occasions are taken as a set of the uplink data channel resources and the demodulation reference signal ports, and a preamble in the set of the preambles is mapped to the set of the uplink data channel resources and the demodulation reference signal ports.

19. The apparatus according to claim 1, wherein in a case where preambles within a time interval are able to be mapped to tuples of the uplink data channel resources and the demodulation reference signal ports within multiple time intervals, the mapping is also performed on the tuples within the multiple time intervals in an incremental order of time.

20. The apparatus according to claim 1, wherein when uplink data channel resources are configured by the network device, demodulation reference signal ports associated with the uplink data channel resources are configured, and preambles associated with the uplink data channel resources and the demodulation reference signal ports or random access occasions associated with the uplink data channel resources and the demodulation reference signal ports or preambles and random access occasions associated with the uplink data channel resources and the demodulation reference signal ports are also configured.

21. A random access apparatus, comprising:
a receiver configured to receive a random access request at least comprising a preamble, uplink data and a demodulation reference signal transmitted by a terminal equipment, wherein mapping of the preamble to an uplink data channel resource of the uplink data and a demodulation reference signal port of the demodulation reference signal is determined according to configuration information or is configured by a network device; and
a transmitter configured to transmit a random access response to the terminal equipment, wherein
when one of preambles is not mapped to the tuple of the uplink data channel resources and the demodulation reference signal ports, a second random access request comprising the preamble but not comprising the uplink data and the demodulation reference signal is transmitted.

22. A communication system, comprising:
a terminal equipment configured to:
transmit a first random access request at least comprising a preamble, uplink data and a demodulation reference signal to a network device, wherein mapping of the preamble to an uplink data channel resource of the uplink data and a demodulation reference signal port of the demodulation reference signal is determined according to configuration information from the network device or is configured by the network device, and
receive a random access response transmitted by the network device; and
the network device configured to receive the first random access request or the second random access request and transmit the random access response to the terminal equipment, wherein
when one of preambles is not mapped to a tuple of the uplink data channel resources and the demodulation reference signal ports, a second random access request comprising the preamble but not comprising the uplink data and the demodulation reference signal is transmitted.

23. The apparatus according to claim 1, wherein
in a case where the preamble is not available, it is determined that the first random access request and the second random access request are not transmitted.

24. The apparatus according to claim 1, wherein the uplink data channel resources of the first group overlap with the uplink data channel resources of the second group, and the overlapped uplink data channel resources are configured with different demodulation reference signal ports.

* * * * *